United States Patent
Zhu et al.

(10) Patent No.: US 12,245,071 B2
(45) Date of Patent: Mar. 4, 2025

(54) CONTINUITY FOR BUFFER STATUS REPORTS

(71) Applicant: QUALCOMM Incorporated, San Diego, CA (US)

(72) Inventors: Xipeng Zhu, San Diego, CA (US); Linhai He, San Diego, CA (US); Luis Fernando Brisson Lopes, Swindon (GB); Gavin Bernard Horn, La Jolla, CA (US); Ozcan Ozturk, San Diego, CA (US); Karthika Paladugu, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/174,274

(22) Filed: Feb. 11, 2021

(65) Prior Publication Data

US 2021/0258823 A1 Aug. 19, 2021

Related U.S. Application Data

(60) Provisional application No. 62/976,257, filed on Feb. 13, 2020.

(51) Int. Cl.
*H04W 28/02* (2009.01)
*H04W 36/00* (2009.01)
(Continued)

(52) U.S. Cl.
CPC ... *H04W 28/0278* (2013.01); *H04W 28/0263* (2013.01); *H04W 36/0072* (2013.01); *H04W 36/0235* (2023.05); *H04W 36/28* (2013.01)

(58) Field of Classification Search
CPC .......... H04L 47/2416; H04W 28/0263; H04W 28/0278; H04W 36/023; H04W 36/0072;
(Continued)

(56) References Cited

U.S. PATENT DOCUMENTS 11,291,036 B2 3/2022 Liu et al.
2014/0335882 A1* 11/2014 Lee ........................ H04W 76/15
455/452.2
(Continued)

FOREIGN PATENT DOCUMENTS

CN 104144512 A 11/2014
CN 110149674 A 8/2019
(Continued)

OTHER PUBLICATIONS

OPPO: "Discussion on RACH-less Handover for NR", 3GPP Draft; R2-1801786 Discussion on RACH-Less Handover for NR, 3GPP, vol. RAN WG2, No. Athens, Greece; Feb. 26, 2018-Mar. 2, 2018 Feb. 13, 2018, XP051398963, Retrieved from the Internet: URL:http://www.3gpp.org/ftp/tsg%5Fran/WG2%5FRL2/TSGR2%5F101 /Docs/ [retrieved on Feb. 13, 2018].
(Continued)

Primary Examiner — Khoa Huynh
(74) Attorney, Agent, or Firm — ArentFox Schiff LLP

(57) ABSTRACT

The present disclosure provides systems, methods, and apparatuses for maintaining continuity of a buffer status report (BSR) from a user equipment (UE) when the UE is handed over between base stations. In one aspect, a base station or a component thereof may be configured to allocate a set of resources for transmission by a UE. The set of resources may have a capacity that is insufficient for an amount of data indicated by a BSR from the UE. The base station or component thereof may be further configured to transmit, to another base station in association with han-
(Continued)

dover of the UE, an indication that the capacity of the set of resources is insufficient for the amount of the data indicated by the BSR.

9 Claims, 14 Drawing Sheets

(51) Int. Cl.
*H04W 36/02* (2009.01)
*H04W 36/28* (2009.01)

(58) Field of Classification Search
CPC ..... H04W 36/22; H04W 36/28; H04W 72/21; H04W 72/23; H04W 36/0235
See application file for complete search history.

(56) References Cited

U.S. PATENT DOCUMENTS

| | | | |
|---|---|---|---|
| 2015/0230235 A1* | 8/2015 | Uchino | H04W 72/20 370/329 |
| 2016/0100397 A1* | 4/2016 | Wen | H04W 76/16 370/329 |
| 2018/0368012 A1 | 12/2018 | Wei | |
| 2019/0053260 A1* | 2/2019 | Shaheen | H04W 72/569 |

FOREIGN PATENT DOCUMENTS

| | | |
|---|---|---|
| CN | 107295658 B | 12/2019 |
| WO | 2014163319 A1 | 10/2014 |
| WO | 2018175919 | 9/2018 |
| WO | 2019158053 A1 | 8/2019 |

OTHER PUBLICATIONS

Qualcomm Incorporated et al: "Remaining BSR Transfer in Handover", 3GPP Draft; R3-210342, 3GPP, vol. RAN WG3, No. Jan. 25, 2021-Feb. 5, 2021 Jan. 15, 2021, XP051975058, Retrieved from the Internet: URL:https://ftp.3gpp.org/tsg_ran/WG3_lu/TSGR3_111-e/Docs/R3-210342.zip R3-210342 Remaining BSR Transfer in handover.doc [retrieved on Jan. 15, 2021].

Qualcomm Incorporated: "Remaining BSR transfer in handover", 3GPP Draft; R3-210343, 3GPP, vol. RAN WG3, No. Online; Jan. 25, 2021-Feb. 5, 2021 Jan. 15, 2021, XP051975059, Retrieved from the Internet: URL:https://ftp.3gpp.org/tsg_ran/WG3_lu/TSGR3_111-e/Docs/R3-210343.zip R3-210343 Remaining BSR CR.docx [retr. on Jan. 15, 2021].

International Search Report and Written Opinion dated May 18, 2021 from corresponding PCT Application No. PCT/US2021/018005.

* cited by examiner

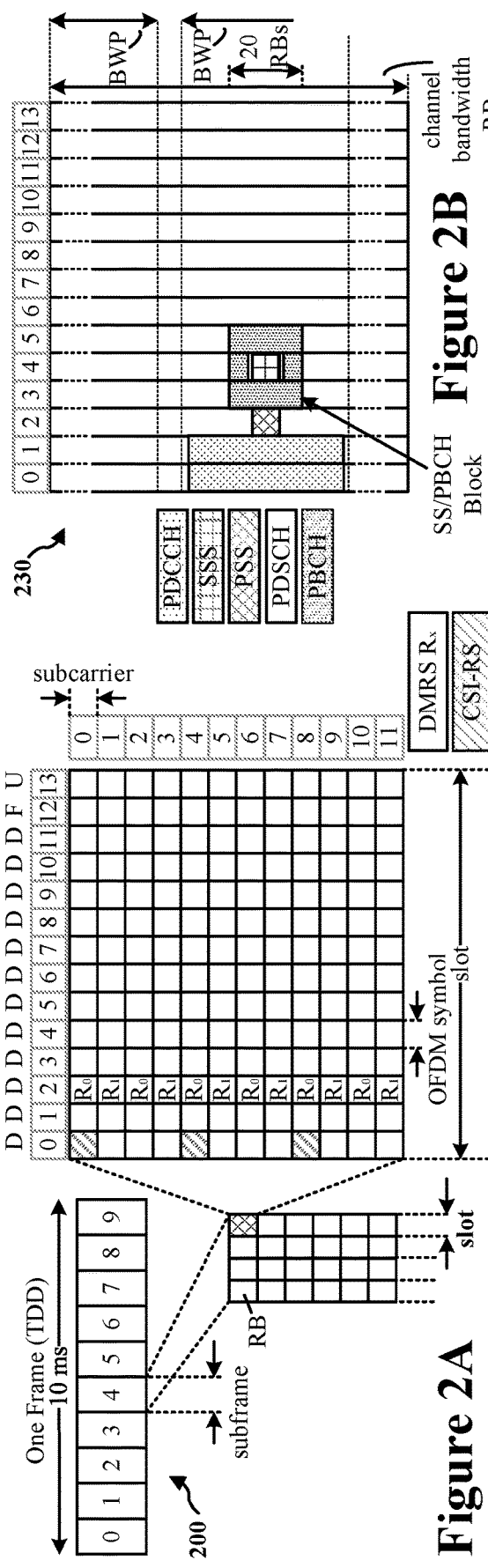
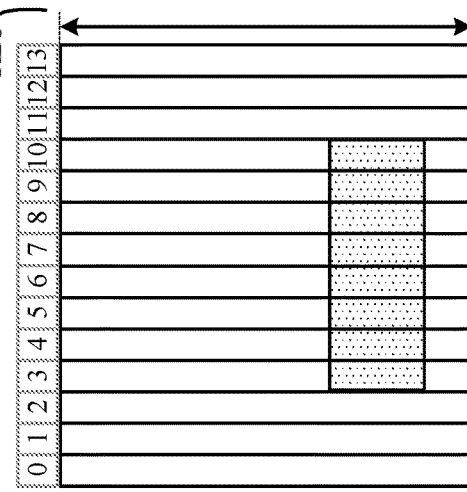
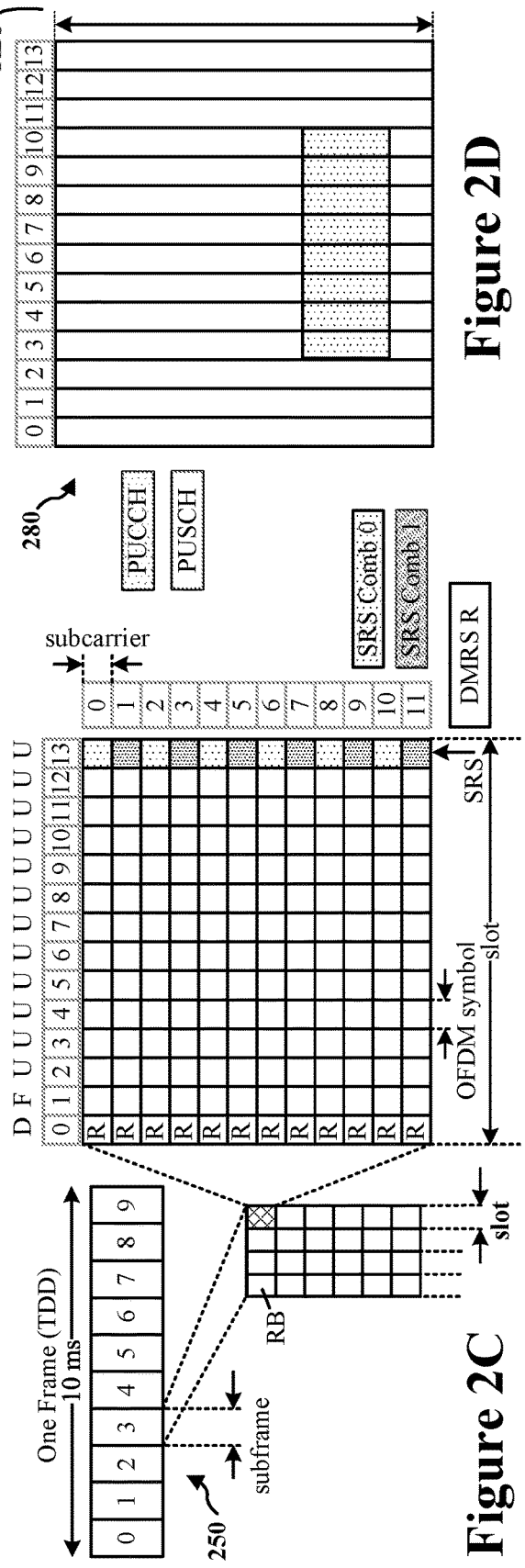
Figure 2A, Figure 2B, Figure 2C, Figure 2D

CONTINUITY FOR BUFFER STATUS REPORTS

CROSS REFERENCE TO RELATED APPLICATION(S)

This Patent Applications claims priority to U.S. Provisional Application Ser. No. 62/976,257, filed on Feb. 13, 2020, entitled "BUFFER STATUS REPORT (BSR) CONTINUITY IN HANDOVER," and assigned to the assignee hereof. The disclosure of the prior Provisional Application is considered part of and is incorporated by reference in this Patent Application.

TECHNICAL FIELD

The present disclosure generally relates to communication systems, and more particularly, to a base station or component thereof configured to allocate a set of resources for transmission by a user equipment (UE), with the set of resources having a capacity that is insufficient for the amount of data indicated by a buffer status report (BSR) from the UE.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for a base station or a component thereof, such as a source base station in handover of a user equipment (UE). The method may include allocating a set of resources for transmission by a UE. The method may further include transmitting, to another base station in association with handover of the UE, an indication that a capacity of the set of resources is insufficient for an amount of data indicated by a buffer status report (BSR) from the UE.

Another innovative aspect of the subject matter described in this disclosure can be implemented as an apparatus, which may be implemented in a base station or a component thereof, such as a source base station in handover of a UE. The apparatus may include means for allocating a set of resources for transmission by a UE. The apparatus may further include means for transmitting, to another base station in association with handover of the UE, an indication that a capacity of the set of resources is insufficient for an amount of data indicated by a BSR from the UE.

A further innovative aspect of the subject matter described in this disclosure can be implemented as an apparatus having a memory with at least one processor coupled to the memory. The apparatus may be implemented in a base station or a component thereof, such as a source base station in handover of a UE. The at least one processor of the apparatus may be configured to allocate a set of resources for transmission by a UE. The at least one processor of the apparatus may be further configured to transmit, to another base station in association with handover of the UE, an indication that a capacity of the set of resources is insufficient for an amount of data indicated by a BSR from the UE.

Still another innovative aspect of the subject matter described in this disclosure can be implemented as a computer-readable medium storing computer-executable code, which may be implemented in a base station or a component thereof. The code, when executed by a processor, may cause the processor to allocate a set of resources for transmission by a UE. Further, the code may cause the processor to transmit, to another base station in association with handover of the UE, an indication that a capacity of the set of resources is insufficient for an amount of data indicated by a BSR from the UE.

One additional innovative aspect of the subject matter described in this disclosure can be implemented as a method for a base station or a component thereof, such as a target base station in handover of a UE. The method may include receiving, from another base station, an indication that the UE is buffering data pending transmission before handover of the UE from the other base station is complete. The method may further include allocating a set of resources for transmission by the UE of the data. The method may further include transmitting a grant to the UE indicating the set of resources allocated for the transmission of the data.

Another innovative aspect of the subject matter described in this disclosure can be implemented as an apparatus, which may be implemented in a base station or a component thereof, such as a target base station in handover of a UE. The apparatus may include means for receiving, from another base station, an indication that the UE is buffering data pending transmission before handover of the UE from the other base station is complete. The apparatus may further include means for allocating a set of resources for transmission by the UE of the data. The apparatus may further include means for transmitting a grant to the UE indicating the set of resources allocated for the transmission of the data.

A further innovative aspect of the subject matter described in this disclosure can be implemented as an apparatus having a memory with at least one processor coupled to the memory. The apparatus may be implemented in a base station or a component thereof, such as a target base station in handover of a UE. The at least one processor of the apparatus may be configured to receive, from another base station, an indication that the UE is buffering data pending transmission before handover of the UE from the other base station is complete. The at least one processor of the apparatus may be further configured to allocate a set of resources for transmission by the UE of the data. The at least one processor of the apparatus may be further configured to transmit a grant to the UE indicating the set of resources allocated for the transmission of the data.

Still another innovative aspect of the subject matter described in this disclosure can be implemented as a computer-readable medium storing computer-executable code, which may be implemented in a base station or a component thereof. The code, when executed by a processor, may cause the processor to receive, from another base station, an indication that the UE is buffering data pending transmission before handover of the UE from the other base station is complete. The code may further cause the processor to allocate a set of resources for transmission by the UE of the data. The code may further cause the processor to transmit a grant to the UE indicating the set of resources allocated for the transmission of the data.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of downlink channels within a subframe.

FIG. 2C is a diagram illustrating an example of a second frame.

FIG. 2D is a diagram illustrating an example of uplink channels within a subframe.

Like reference numbers and designations in the various drawings indicate like elements.

DETAILED DESCRIPTION

Figure 1:
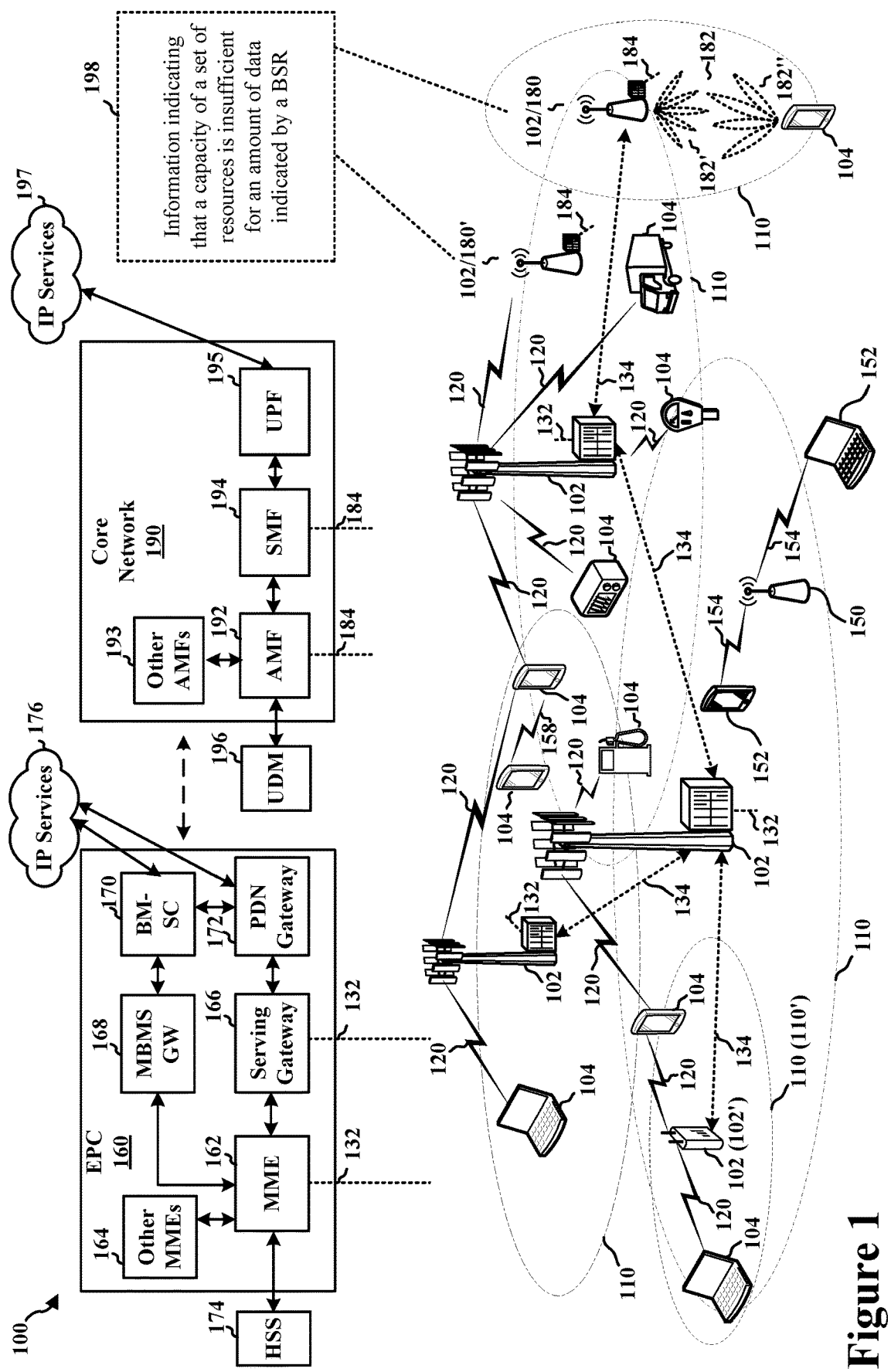
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Advanced Mobile Phone System (AMPS), Long Term Evolution (LTE) and various extensions thereof (such as LTE-Advanced (LTE-A) and LTE-License Assisted Access (LTE-LAA)), New Radio (NR), or other known signals that are used to communicate within a wireless, cellular or internet of things (TOT) network, such as a system utilizing 3G, 4G or 5G, or further implementations thereof, technology.

In some access networks and other wireless communications networks, some connections are established between a user equipment (UE) and base stations, such as when a UE operates on a cell provided by a base station. A cell may cover a finite geographic area, which may not encompass all locations at which the UE may be located at various times. When the UE travels beyond the coverage of one cell provided by one base station, the UE may come to be within the coverage of another cell provided by another base station. In order to ensure service continuity, avoid data loss, and the like, the UE may be handed over from the one base station (such as a source base station) to another base station (such as a target base station).

In order to transmit data to a base station, the UE may transmit a buffer status request (BSR) to the base station, such as when the UE has some data stored in at least one transmission buffer (such as an uplink buffer). The BSR may indicate an amount of data in the transmission buffer, which may indicate an amount of data that the UE is requesting to transmit. In response to the BSR, the base station may begin allocating resources for transmission of the data by the UE.

However, as some UEs have relatively high mobility, handover of the UE may prevent the base station from allocating resources having sufficient capacity for the amount of data that the UE is requesting to transmit. For example, handover of the UE may be initiated when the base station allocates resources having a capacity sufficient for an amount of data in one logical channel group (LCG), but the base station may be unable to allocate other resources having sufficient capacity for data in other LCGs. When handed over to another base station, the UE may continue to buffer the data in the other LCGs because resources have not been allocated for such a transmission by the UE.

The other base station may be unaware that the UE still has some data to transmit. As the UE transmitted the BSR to the base station, the UE may need to transmit another BSR to the other base station, for example, once the UE determines that an uplink grant allocating resources for the remaining data in the other LCGs is absent. Further, the other base station may delay allocating resources to the UE until handover of the UE to the other base station is completed. Such redundant BSR transmission and delay in allocating resources may increase at least one of latency, network congestion, or computational load on the UE (such as when data accumulates in the buffer of the UE while awaiting an uplink grant).

In order to avoid such adverse effects, the present disclosure describes various innovative aspects in which a source base station allocates a portion of the resources commensurate with the amount of data a UE requests to transmit, and when the UE is handed over to a target base station, the source base station transmits information indicating a remaining amount of data for which resources have not been allocated to the target base station.

Thus, some innovative aspects of the present disclosure may be implemented by a base station or a component thereof that is configured to allocate a set of resources for transmission by a UE. The base station or component thereof may be further configured to transmit, to another base station in association with handover of the UE, an indication that a capacity of the set of resources is insufficient for an amount of data indicated by a BSR from the UE.

When the target base station receives such information indicating a remaining amount of data for which resources have not been allocated from the source base station, the target base station may allocate the other portion of the resources commensurate with the amount of data that the UE requested to transmit. Potentially, the target base station may do so before another BSR is received from the UE or before handover of the UE is complete.

Thus, some other innovative aspects of the present disclosure may be implemented by a base station or a component thereof that is configured to receive, from another base station, an indication that the UE is buffering data pending transmission before handover of the UE from the other base station is complete. The base station or a component thereof may be further configured to allocate a set of resources for transmission by the UE of the data. The base station or a component thereof may be further configured to transmit a grant to the UE indicating the set of resources allocated for the transmission.

Accordingly, innovative aspects of the present disclosure provide for continuity of a BSR from a UE between a source base station and the target base station during handover of the UE. Such BSR continuity may enable the target base station to schedule the UE for uplink transmission without receiving another BSR from the UE. The UE may transmit a BSR to the source base station, reporting the amount of data available for uplink on the UE. Prior to the handover, the UE may transmit some buffered data reported in the BSR on resources allocated by the source base station, but the UE may continue to buffer remaining data for which resources have not yet been allocated. During the handover, the source base station may transmit information indicating data for which the UE has already requested resources has not been scheduled by the source base station. For example, such information may indicate an amount of data reported in the BSR minus the amount of data received by the source base station. The target base station may schedule the UE to uplink the remaining data before receiving a BSR from the UE.

Particular implementations of the subject matter described in this disclosure can be implemented to realize one or more of the following potential advantages. Transmission of information indicating a portion of data to be transmitted by a UE as requested in a BSR from a source base station to a target base station in association with handover of the UE may reduce latency at the UE. For example, latency experienced by the UE may be reduced when the UE is buffering data to transmit to a network that includes the source base station and the target base station. Such a reduction in latency at the UE may improve UE performance by avoiding bottleneck scenarios in which some operations cannot be executed until other operations have completed, such as transmitting some data to the network.

Additionally, transmission of information indicating a portion of data to be transmitted by a UE as requested in a BSR from a source base station to a target base station in association with handover of the UE may reduce at least one of computational load, memory usage, or other overhead at the UE. The target base station may allocate resources for transmission by the UE more quickly when the target base station receives information indicating remaining data the UE requests to transmit than when the target base station receives a BSR from the UE, the amount of data that accumulates in the transmission buffer of the UE may be reduced. For example, by reducing the time a UE waits before transmitting data on allocated resources, the UE may avoid buffer overflow, packet loss, or other similar problems because the UE is able to empty the transmission buffer more quickly.

Furthermore, transmission of information indicating a portion of data to be transmitted by a UE as requested in a BSR from a source base station to a target base station in association with handover of the UE may improve efficient use of resources allocated by a base station. For example, the target base station may schedule the UE for transmission using information received from the source base station. Accordingly, the target base station may schedule resources for transmission by the UE commensurate with the amount of data that the UE has continued to buffer. In so doing, the target base station may schedule resources having a sufficient capacity to carry that data the UE continues to buffer. Therefore, the target base station may avoid scheduling too many (or too few) resources, which may contribute to network congestion or packet loss (such as when packets become stale or dropped).

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y megahertz (MHz) (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, such as in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same unlicensed frequency spectrum (such as 5 GHz, or the like) as used by the Wi-Fi AP 150. The small cell 102', employing NR in an unlicensed frequency spectrum, may boost coverage to or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (such as macro base station), may include or be referred to as an eNB, gNodeB (gNB), or another type of base station. Some base stations, such as gNB 180 may operate in a traditional sub 6 GHz spectrum, in millimeter wave frequencies, or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include multiple antennas, such as antenna elements, antenna panels, or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first base station 102/180 may allocate a set of resources for transmission by a UE 104. In some aspects, the base station 102/180 may allocate the set of resources with a capacity that is insufficient for an amount of data indicated by a BSR from the UE 104. In some aspects, the UE 104 may be handed over from the first base station 102/180 (or source base station) to a second base station 102/180' (or target base station). In association with the handover of the UE 104, the first base station 102/180 may transmit an indication that the capacity of the set of resources is insufficient for the amount of data indicated by the BSR (198).

Correspondingly, the second base station 102/180' may receive the indication that the capacity of the set of resources is insufficient for the amount of data indicated by the BSR (198). Such an indication may provide information indicating the UE 104 has data for which resources remain to be allocated. Accordingly, the second base station 102/180' may allocate another set of resources for transmission by the UE 104 of such data. The second base station 102/180' may transmit a grant to the UE 104 indicating the other set of resources allocated for the transmission. For example, the second base station 102/180' may transmit the grant to the UE 104 in absence of a BSR from the UE 104 or before handover of the UE 104 from the first base station 102/180 is complete.

Various aspects associated with communication of information indicating a portion of data to be transmitted by a UE as requested in a BSR from one base station to another base station in association with handover of the UE are described herein. Although the present disclosure may focus on 5G NR, the concepts and various aspects described herein may be applicable to other similar areas, such as LTE, LTE-A, CDMA, GSM, or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description provided herein applies also to a 5G NR frame structure that is TDD.

Other wireless communication technologies may have a different frame structure or different channels. A frame, which may be of 10 milliseconds (ms), may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot or reference signal (RS) for the UE. In some configurations, an RS may include at least one demodulation RS (DM-RS) (indicated as $R_x$ for one particular configuration, where 100x is the port number, but other DM-RS configurations are possible) or at least one channel state information (CSI) RS (CSI-RS) for channel estimation at the UE. In some other configurations, an RS may additionally or alternatively include at least one beam measurement (or management) RS (BRS), at least one beam refinement RS (BRRS), or at least one phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), or UCI.

Figure 3:
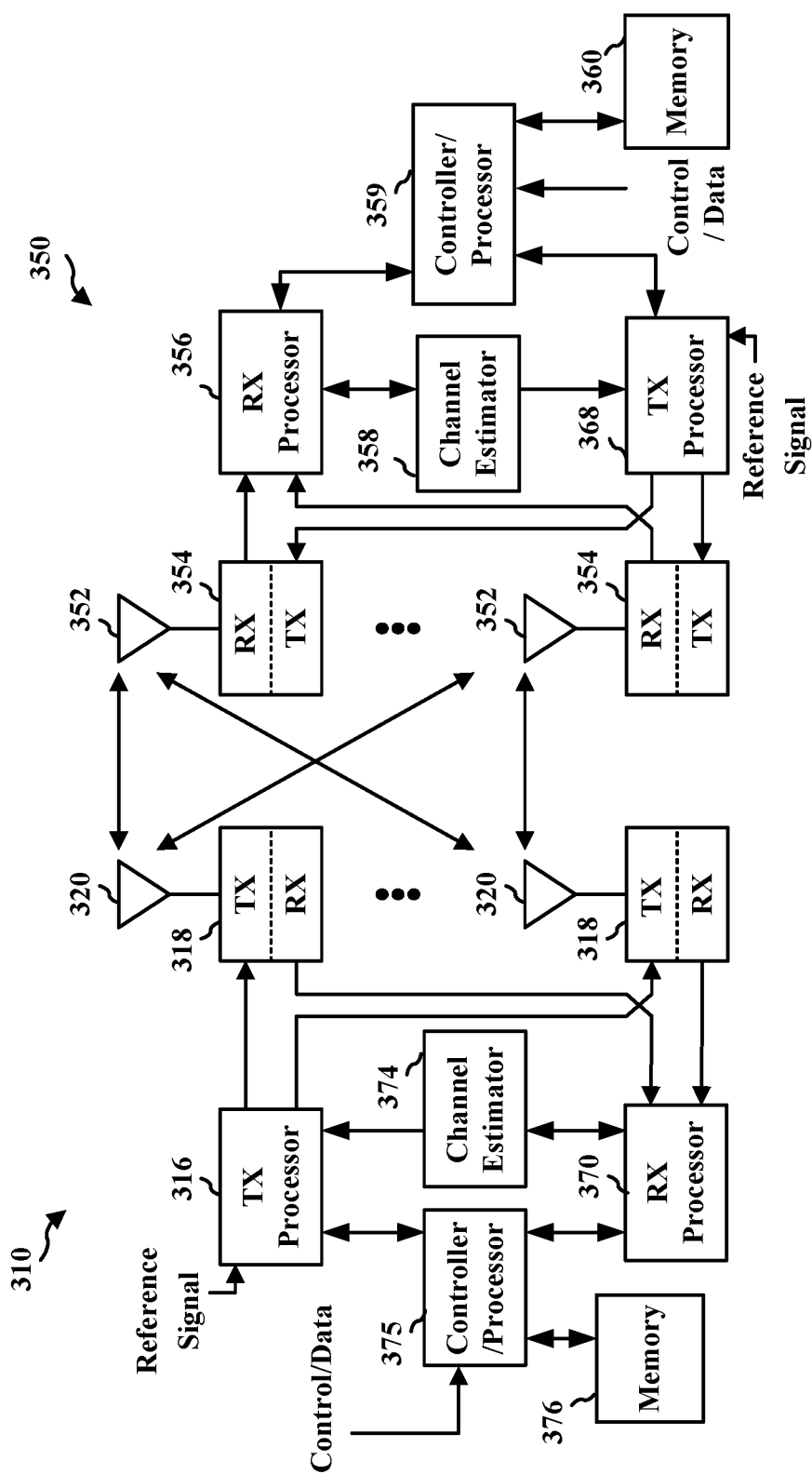
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through a respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through a respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 316, the RX processor 370, and the controller/processor 375 may be configured to perform aspects in connection with (198) of FIG. 1.

A BSR may be a message identifying the amount of data available in a set of buffers of a UE, such as a set of uplink transmission buffers in which the UE stores (or buffers) data that the UE is to transmit to a base station. For example, a UE may transmit a BSR in a MAC control element (CE). The BSR may function to indicate that the UE is requesting that the base station allocate resources for the data in the set of buffers.

In some aspects, data stored (or buffered) by a UE may be associated with an indication of the priority of the data relative to other data. For example, data that is transmitted over one radio bearer, such as one dedicated radio bearer (DRB), may have a relatively higher priority than other data transmitted over another radio bearer. Data may be prioritized based on at least one of a QoS of the data, QoS Class Identifier (QCI), budget delay, or other such characteristic or related parameter of data.

Potentially, some base stations may not provide UEs with grants that are specific to DRBs, which may be one approach to prioritizing some data over other data. Instead, data may be associated with a logical channel (LCH), which may convey some metadata, including the priority of the data. The UE may store many different data associated with many different LCHs, which may increase the complexity at the base station in selecting which data to schedule before other data. Therefore, multiple LCHs associated with different data stored by the UE may be grouped together into one or more logical channel groups (LCGs). For example, two or more LCHs having the same or approximately similar priorities may be grouped together in one LCG.

When the UE transmits a BSR to the base station, the BSR may indicate that the UE is requesting to transmit data associated with one or more LCGs. Specifically, the BSR may include information indicating, for each of the one or more LCGs, an identifier (ID) of the LCG and an amount of data associated with the LCG. The base station may receive the BSR and, based thereon, the base station may schedule transmission by the UE. For example, the base station may schedule transmission of data associated with an LCG having a higher priority relative to another LCG before other data associated with the other LCG is scheduled.

Some BSRs may be of a different type or different format than other BSRs, and a UE may be configured to select which BSR to use based on the data in the set of buffers. In some aspects, a BSR may be a short BSR, short truncated BSR, long BSR, or long truncated BSR. By way of illustration and not limitation, the UE may use a long BSR in some instances in which the UE is storing (or buffering) respective data associated with each of two or more LCGs, and the UE may use a short BSR in some instances in which the UE is storing (or buffering) data associated with one LCG.

Accordingly, a short BSR may indicate that the UE is requesting to transmit data associated with one LCG, whereas the long BSR may indicate that the UE is requesting to transmit data associated with more than one LCG. In some instances, the UE may use a short truncated BSR or a long truncated BSR, such as when the UE transmits a padding BSR. For example, the UE may use a short truncated BSR if the UE is storing different data associated with more than one LCG (such as at the time at which the BSR is to be built by the UE) and the number of padding bits is equal to the size of the short BSR plus the subheader. If the number of padding bits is larger than the size of the short BSR plus the subheader but smaller than the size of the long BSR plus the subheader and the UE is storing different data associated with more than one LCG, the UE may use the long truncated BSR.

When transmitting a short truncated BSR to the base station, the UE may include information therein that indicates an LCG having an LCH associated with the highest priority of the LCHs associated with data that the UE is requesting to transmit (and the amount of data associated with the LCG having the highest priority LCH). When transmitting a long truncated BSR, the UE may include information therein that indicates the LCGs having LCHs ordered from highest priority to lowest priority, regardless of whether the UE is requesting to transmit data associated with each of the LCHs. In the case of equal priority across the LCGs, the UE may transmit a BSR in which the LCGs are ordered according to LCG ID, in increasing order.

Figure 4:
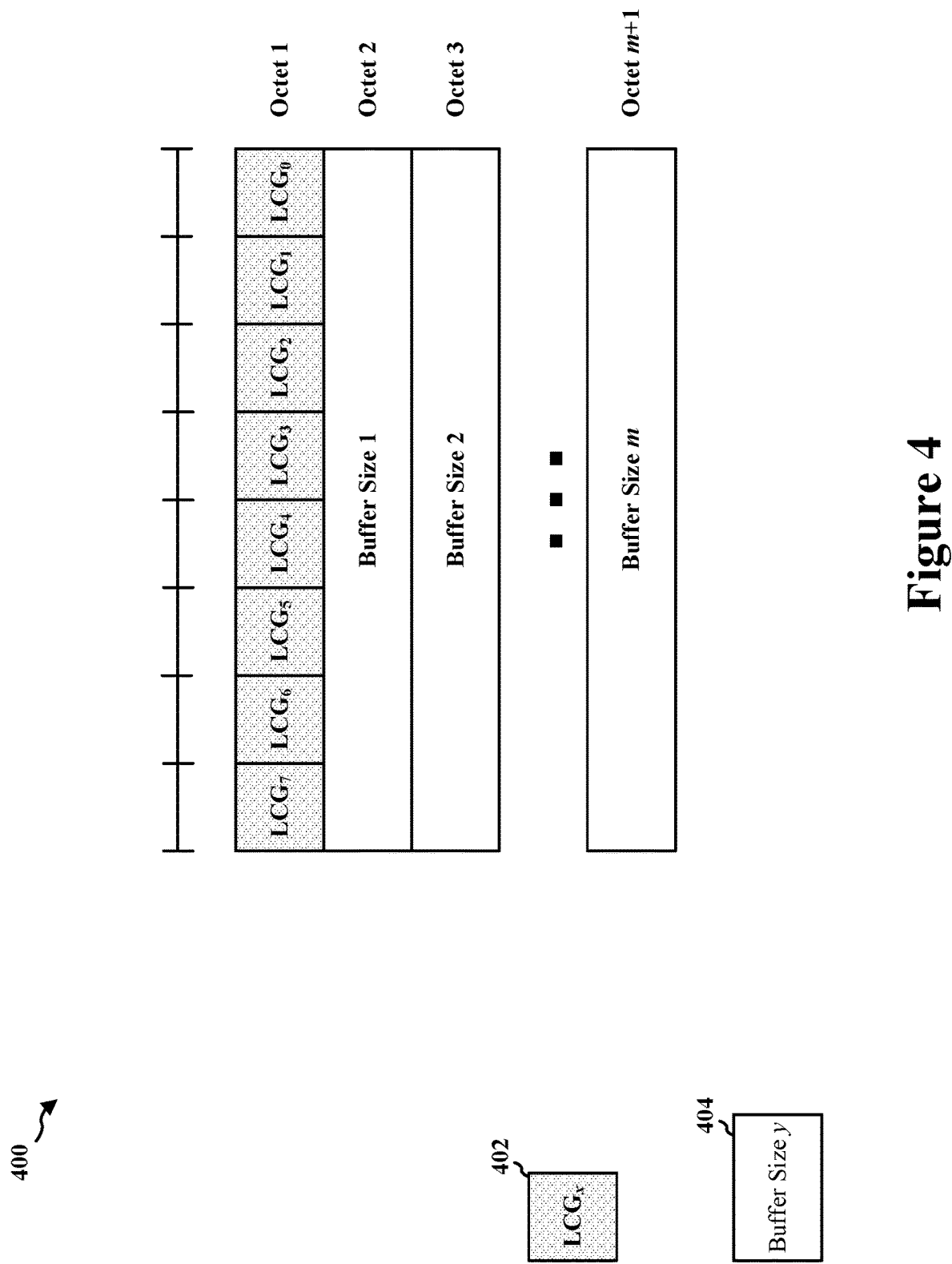
FIG. 4 is a block diagram illustrating example implementations of a buffer status report (BSR) as one of a long BSR or a long truncated BSR.

FIG. 4 is a block diagram illustrating example implementations of a BSR 400 as one of a long BSR or a long truncated BSR. The BSR 400 may include multiple LCG indicators 402, each of which may correspond to an LCG having a set of LCHs. Each of the LCG indicators 402 may indicate whether the amount of data associated with a corresponding LCG is reported in the BSR. The BSR may further include multiple fields that each is configured to convey a buffer size 404, such as the amount of data associated with one of the LCGs that a UE is requesting to transmit in the BSR 400.

For example, the long BSR or long truncated BSR may be an octet string including include multiple octets 1 to m+1. Each bit in a first octet 1 may correspond to a different LCG. If the bit is set to one value (such as 1), the BSR may include a field indicating one buffer size 404, which may allow the UE to report the amount of data on a buffer for the corresponding LCG. If the bit is set to another value (such as zero), the BSR may not include a buffer size for the corresponding LCG. However, each of the octets 2 through m+1 may include a field indicating one buffer size 404 for one of the LCGs, as indicated in the first octet 1.

When populating the BSR, the UE may configure each buffer size 404 in the octets 2 through m+1 according to some criteria or formatting. For example, the UE may build the BSR 400 so that each buffer size 404 is an index corresponding to a range that includes the amount of available data for the associated LCG. Illustratively, a field configured with a buffer size of 00001110 (or "14") may indicate that the amount of available data is between 24 and 25 bytes, and a field configured with a buffer size of 11111101 (or "253") may indicate that the amount of available data is between 76,380,419 and 81,338,368 bytes.

According to the illustrated aspects, each of the fields in octets 2 through m+1 may be one octet (having eight bits). However, other configurations of the BSR may be possible in some other aspects. For example, fewer or more than eight bits may be configured to convey multiple LCG indicators 402, or fewer or more than eight bits may be configured to convey each buffer size 404.

Figure 5:
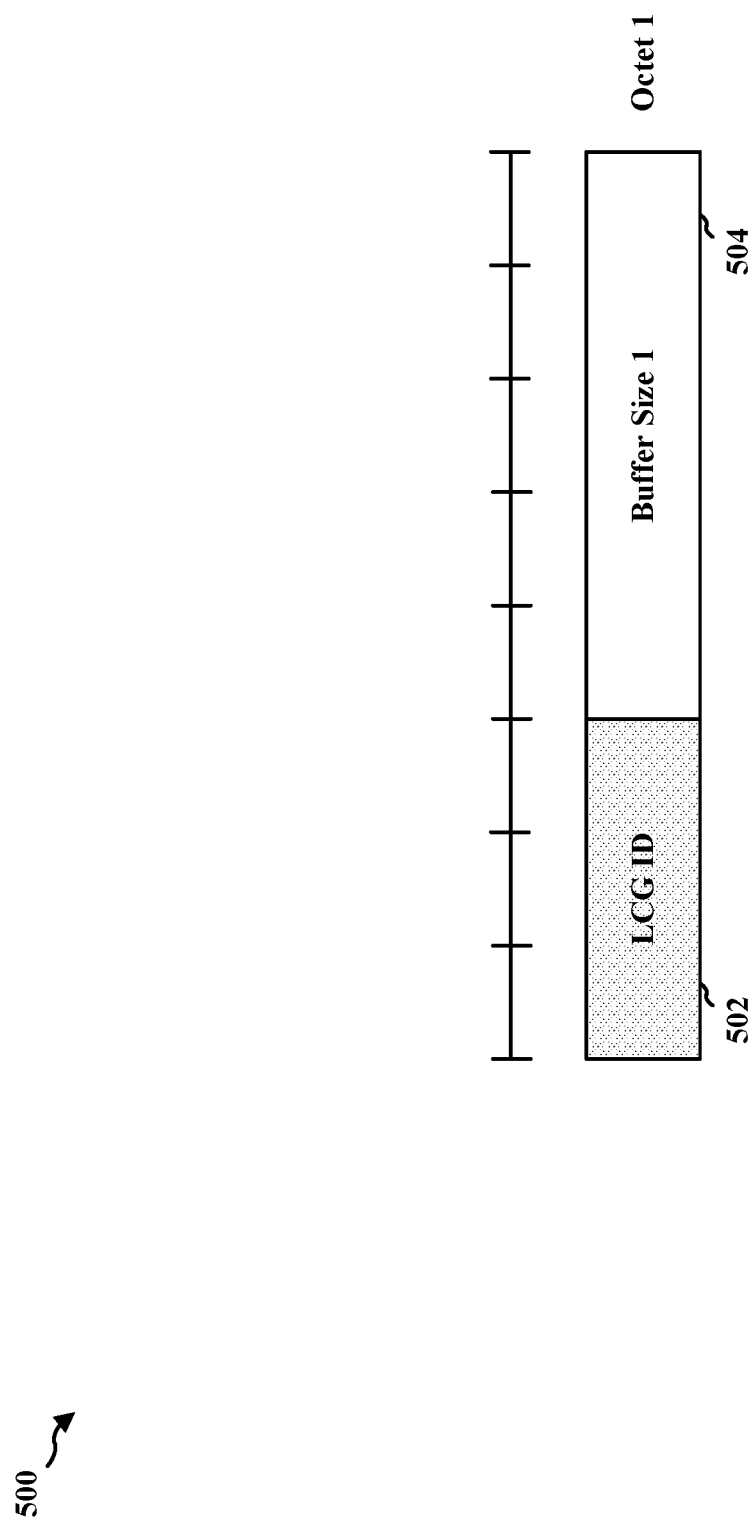
FIG. 5 is a block diagram illustrating other example implementations of a BSR as one of a short BSR or a short truncated BSR.

FIG. 5 is a block diagram illustrating other example implementations of a BSR 500 as one of a short BSR or a short truncated BSR. When implemented as a short BSR or short truncated BSR, the BSR 500 may indicate one LCG. Specifically, the BSR 500 may include a field for an LCG ID 502 that identifies the one LCG for which the BSR 500 carries information.

To that end, the BSR 500 may further include a field configured to include information indicating a buffer size 504. In some aspects, the buffer size 504 may indicate the amount of data available for transmission for the LCG associated with the LCG ID 502.

In some aspects in which the BSR 500 is implemented as a short BSR, the LCG ID 502 may correspond to an LCG associated with data stored by a UE for transmission, such as when no other data associated with any of the other LCGs is stored by the UE for transmission or the UE otherwise does not request transmission of other data associated with the other LCGs. In some other aspects in which the BSR 500 is implemented as a short truncated BSR, the LCG ID 502 may be configured to indicate an LCG having an LCH associated with the highest priority of the LCHs associated with any data available for transmission at the UE.

Similar to implementations of a long BSR and a long truncated BSR shown in FIG. 4, a UE may adhere to some criteria or formatting when building the BSR 500 implemented as one of a short BSR or a short truncated BSR. For example, the UE may configure the buffer size 504 as an index corresponding to a range that includes the amount of available data for the LCG identified in the LCG ID 502. Illustratively, a field configured with a buffer size of 00010 (or "2") may indicate that the amount of available data is between 11 and 14 bytes, and a field configured with a buffer size of 11110 (or "30") may indicate that the amount of available data is between 107,669 and 150,000 bytes.

According to some implementations, the BSR 500 that is at least one of a short BSR or a short truncated BSR may be a single octet indicating both the LCG ID 502 and the buffer size 504 associated therewith. For example, a field configured for the LCG ID 502 may be a three-bit field, which allows for the LCG ID 502 to be conveyed in three bits. Further to the example, another field configured for the buffer size 504 may be a five-bit field, which allows for the buffer size 504 to be conveyed in five other bits.

Figure 6:
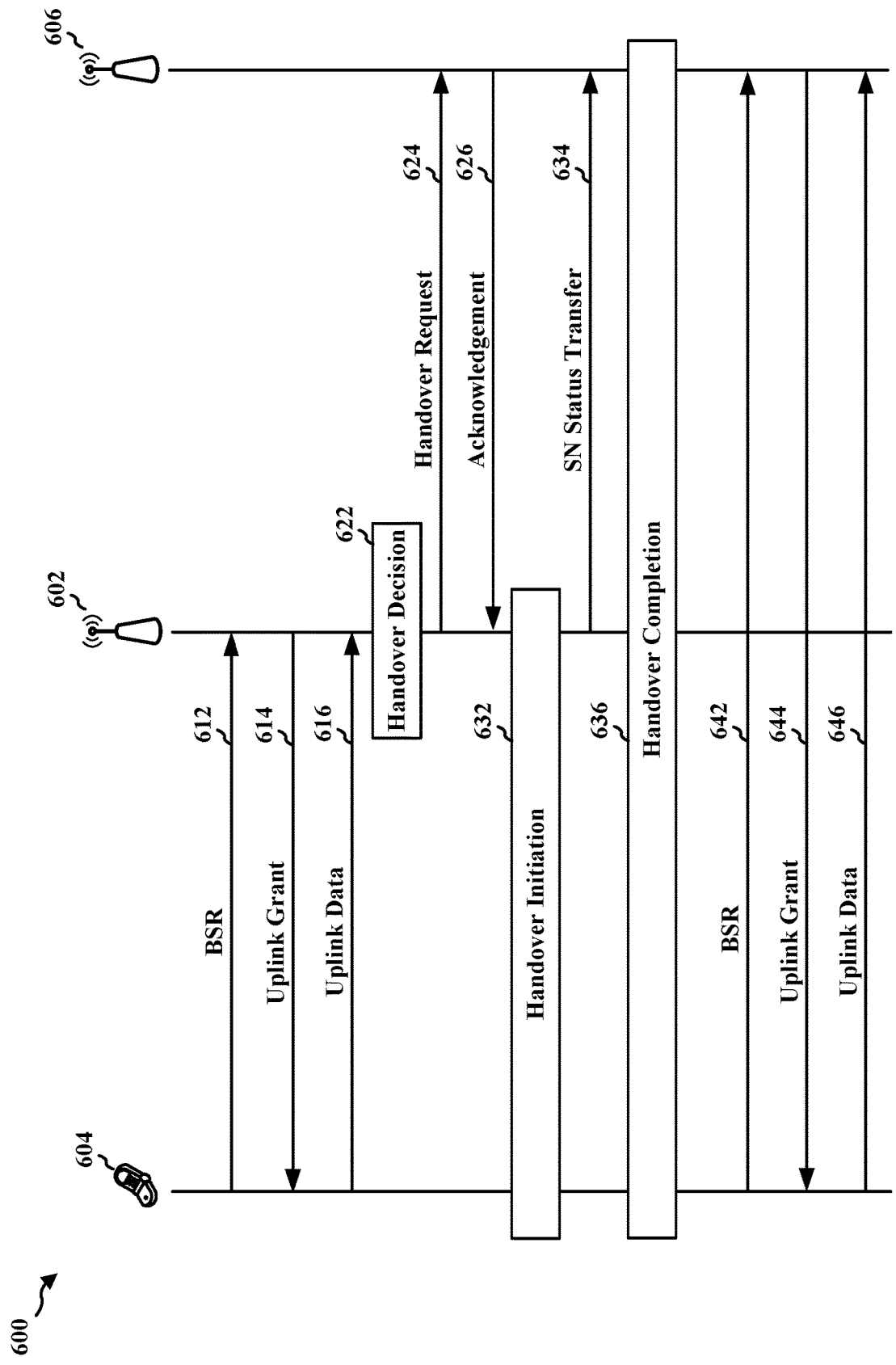
FIG. 6 is a call flow diagram illustrating an example communications flow in an access network including a source base station and a target base station that fail to maintain continuity of a BSR from a UE during handover of the UE.

FIG. 6 is a call flow diagram illustrating an example communications flow 600 in an access network that includes a source base station 602 and a target base station 606 that fail to maintain continuity of a BSR from a UE 604 during handover of the UE 604. The example communications flow 600 may begin with the UE 604 being in communication with the source base station 602. For example, the UE 604 may have timing synchronization with the source base station 602, or a link between the source base station 602 and the UE 604 may be established. The UE 604 may transmit a first BSR 612 (such as a BSR 400 implemented as one of a long BSR or long truncated BSR, as shown in FIG. 4, or a BSR 500 implemented as one of a short BSR or short truncated BSR, as shown in FIG. 5). The source base station 602 may receive the first BSR 612, may schedule a set of resources on which the UE 604 may transmit some, but not all, of the data identified in the first BSR 612. That is, the set of resources scheduled by the source base station 602 may have a capacity—such as the amount of data that can be carried on or mapped on7 to (an available portion of) a scheduled set of resources—that is insufficient for the amount of data requested to be transmitted by the UE 604 according to the first BSR 612.

Even though the source base station 602 may not schedule resources for all of the data indicated by the first BSR 612, the source base station 602 may transmit an uplink grant 614 to the UE 604 indicating the set of resources on which the UE 604 is scheduled to transmit a portion of the data indicated by the first BSR 612. The UE 604 may receive the uplink grant 614 and may transmit the uplink data 616 to the source base station 602, although other data that is not scheduled by the source base station 602 may be remain buffered at the UE 604.

The source base station 602 may make a handover decision 622, according to which the source base station 602 determines to handover a connection with the UE 604 to a target base station 606. According to the handover decision 622, the source base station 602 may transmit a handover request 624 to the target base station 606. The target base station 606 may receive the handover request 624 and perform access control to determine whether to accept the handover. If the target base station 606 determines to accept the handover, the target base station 606 may transmit a handover acknowledgement 626 to the source base station 602.

Upon receiving the handover acknowledgement 626, the source base station 602 and the UE 604 may being the handover procedure of the UE 604 with handover initiation 632. The UE 604 may detach from the source base station 602 and may synchronize with the target base station 606. The source base station 602 may stop transmitting to the UE 604.

Further, the source base station 602 may transmit a sequence number (SN) status transfer message 634 to the target base station 606. The SN status transfer message 634 may communicate at least one of an uplink delivery status or a downlink delivery status of the UE 604 to the target base station 606, including information indicating, for at least one of an uplink direction to the source base station 602 from the UE 604 or a downlink direction from the source base station 602 to the UE 604, a set of packets that have been delivered, a set of packets that have not been delivered, and the next sequence number of the next packet to be delivered.

The UE 604 and the target base station 606 may reach handover completion 636, for example, when an access network connection for the UE 604 is established through the target base station 606. Upon handover completion 636, the UE 604 obtain timing synchronization with the target base station 606 and any communication with the source base station 602 may cease.

During handover of the UE 604, the source base station 602 and the target base station 606 may fail to maintain continuity of the first BSR 612, which may leave the UE 604 with unscheduled data during at least a portion of the handover procedure. Further, as such continuity of the first BSR 612 is lost, the target base station 606 may be unaware of an amount of (or if) some other data not scheduled by the uplink grant 614 remains available for uplink transmission at the UE 604 (such as an amount of data in a set of uplink transmission buffers at the UE 604), and so the target base station 606 may be unaware of a how many (or if) resources the target base station 606 should schedule for uplink transmission by the UE 604. Accordingly, upon handover completion 636, the UE 604 may transmit a second BSR 642 to the target base station 606.

The data available for transmission by the UE 604, including the amount thereof, may change after the UE 604 transmits the uplink data 616 to the source base station 602, and therefore, the second BSR 642 may be different from the first BSR 612. The target base station 606 may receive the second BSR 642 and, based thereon, the target base station 606 may schedule a set of resources to carry at least some of the data available for transmission at the UE 604.

The target base station 606 may transmit an uplink grant 644 to the UE 604, with the uplink grant 644 identifying the set of resources scheduled for the UE 604 to transmit data available for transmission at the UE 604 (such as data buffered at the UE 604 when the UE 604 is constructing the second BSR 642). The UE 604 may receive the uplink grant 644 and may identify the set of resources on which the UE 604 is scheduled to transmit. The UE 604 may assign uplink data 646 across the set of resources, and the uplink data 646 may be transmitted to the target base station 606.

According to aspects illustrated by FIG. 6, the target base station 606 waits until the second BSR 642 is received before scheduling resources for uplink transmission by the UE 604. Potentially, the UE 604 may not transmit the second BSR 642 until after handover completion 736, and therefore, transmission of at least some of the uplink data 646 that was available at the UE 604 when the first BSR 612 was built or transmitted may be delayed for a non-negligible time period. Such delay may be impact latency in the access network, and for the UE 604 in particular.

In some aspects, potential approaches to addressing delayed transmission of data available at the UE 604 may include transmission of the second BSR 642 in a random access channel (RACH) message exchanged during a RACH procedure through which the UE 604 may obtain timing synchronization with, obtain an uplink grant from, or otherwise connect to the target base station 606.

For example, in a two-step RACH, the UE 604 may transmit the second BSR 642 in messageA (MsgA). However, the MsgA payload capacity may be insufficient to carry a BSR or expensive in terms of importance for the UE to maintain network connection and synchronization, and therefore, including the second BSR 642 in a MsgA of a RACH procedure may be undesirable.

In another example, to reduce some delay in transmission of uplink data after a handover procedure, the UE may transmit the uplink data 646 on semi-persistent scheduling (SPS) resources or configured grant (CG) resources. However, the SPS resources or CG resources may have a capacity that is insufficient to carry the amount of uplink data 646 available for transmission at the UE 604, and so transmission of the uplink data 646 would still be delayed, or the SPS resources or CG resources may have a capacity that appreciably greater than the amount of uplink data 646 available for transmission at the UE 604, and so an appreciable amount of SPS resources or CG resources would be wasted and potentially cause network inefficiencies or delays to other devices.

In a further example, after completion of the handover completion 636, the target base station 606 may (preemptively) transmit an uplink grant to the UE 604, for example, before the target base station 606 receives the second BSR 642. In particular, the target base station 606 may allocate a relatively large number of resources for uplink transmission by the UE 604, such as a number of resources greater than an average number of resources that UEs request to be allocated, even though the target base station 606 would be unaware of the amount of uplink data 646 the UE 604 has available for uplink transmission at the time of the grant. This scheduling approach may negatively impact network perform and efficiency, potentially increasing latency, as any unused resources would be wasted.

Figure 7:
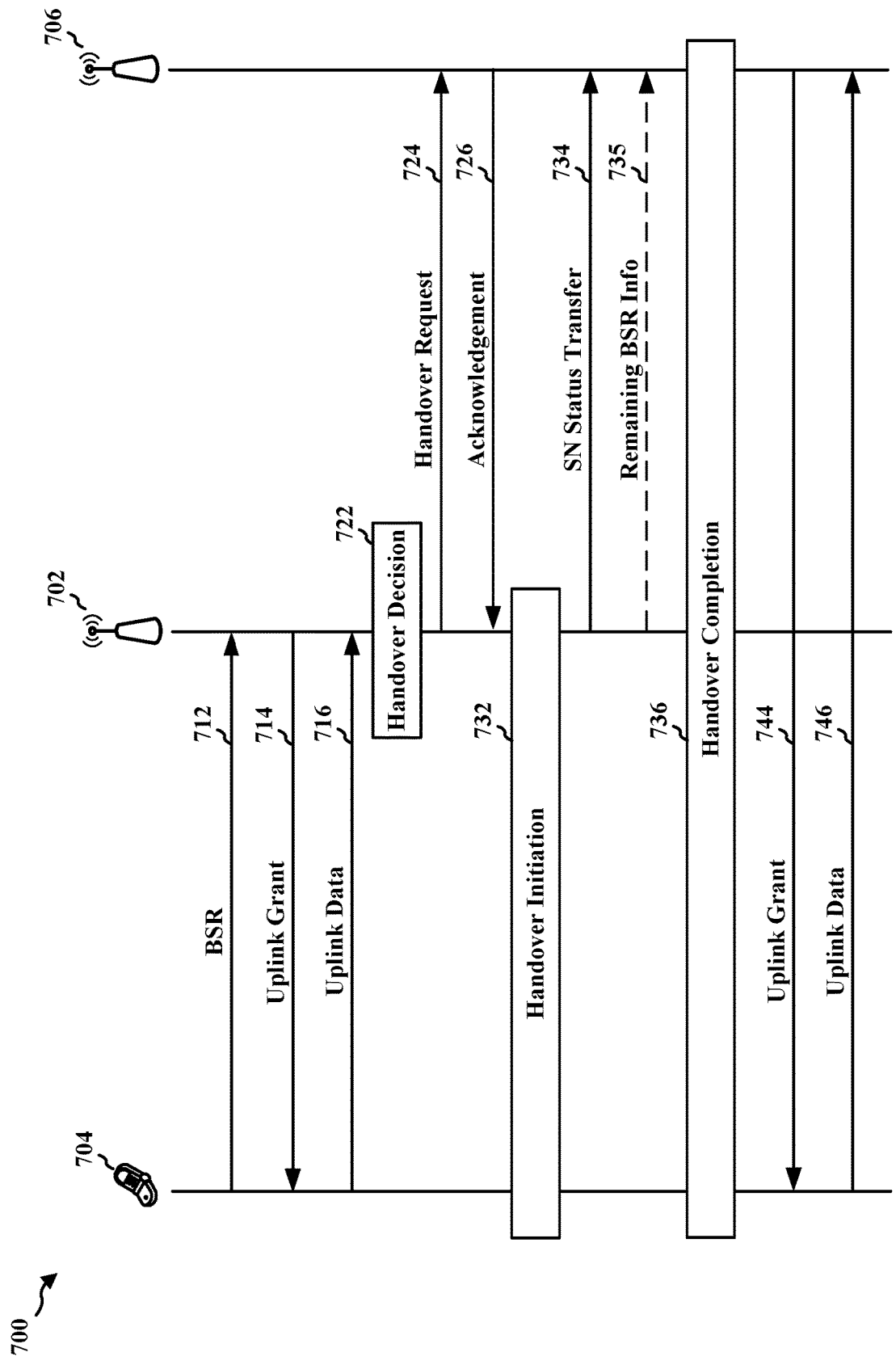
FIG. 7 is call flow diagram illustrating another example communications flow in an access network that includes a source base station and a target base station that maintain continuity of a BSR from a UE during handover of the UE.

FIG. 7 is call flow diagram illustrating another example communications flow 700 in an access network that includes a source base station 702 and a target base station 706 that maintain continuity of a BSR 712 from a UE 704 during handover of the UE 704. In various aspects of the example communications flow 700, one or more of the illustrated communications or operations are illustrated as being practiced by the source base station 702 or the target base station 706; however, the present disclosure comprehends aspects in which one, some, or all of the communications and operations are performed by at least one component or apparatus of a base station.

In some examples, a component or apparatus of a base station may include at least one processor, which may be coupled to a memory and configured to execute instructions stored in the memory. In some other aspects, a component or apparatus of a base station may include a baseband unit or other chip, which may include or may be coupled with the at least one processor. In still other examples, a component or apparatus of a base station may include at least one of a central unit (CU), a distributed unit (DU), a radio unit (RU) or radio head (RH), such as a remote RH (RRH), or another system or device facilitating connectivity in at least some RANs, including an Open RAN (ORAN) or Virtualized (VRAN).

According to various aspects, the example communications flow 700 may begin with the UE 704 being in communication with the source base station 702. For example, the UE 704 may have timing synchronization with the source base station 702, or a link between the source base station 702 and the UE 704 may be established. The UE 704 may transmit a BSR 712 (such as a BSR 400 implemented as one of a long BSR or long truncated BSR, as shown in FIG. 4, or a BSR 500 implemented as one of a short BSR or short truncated BSR, as shown in FIG. 5). The source base station 702 may receive the BSR 712, may schedule a set of resources on which the UE 704 may transmit some, but not all, of the data indicated in the BSR 712. That is, the set of resources scheduled by the source base station 702 may have a capacity—such as the amount of data that can be carried on or mapped onto (an available portion of) a scheduled set of resources—that is insufficient for the amount of data requested to be transmitted by the UE 704 according to the BSR 712. In some aspects, at least one of the amount of data indicated in the BSR 712 or the capacity of the set of resources may be measured in bytes. For example, the source base station 702 may allocate a set of resources capable of carrying a first amount of bytes after receiving the BSR 712 that indicates a second amount of bytes of data buffered by the UE 704 pending transmission. The first amount of bytes may be less than the second amount of bytes.

Even though the source base station 702 may not schedule resources for all of the data indicated by the BSR 712, the source base station 702 may transmit an uplink grant 714 to the UE 704 indicating the set of resources on which the UE 704 is scheduled to transmit a portion of the data indicated by the BSR 712. The UE 704 may receive the uplink grant 714 and may transmit the uplink data 716 to the source base station 702, although other data that is not scheduled by the source base station 702 may be remain buffered at the UE 704.

Due to factors such as UE mobility, the UE 704 may travel toward, and then beyond, an edge of a cell provided by the source base station 702. When the channel quality between the UE 704 and the source base station 702 meets at least one criterion (such as a threshold level set for minimum channel quality), the source base station 702 may make a handover decision 722, and in so doing, the source base station 702 may determine to handover the connection with the UE 704 to a target base station 706.

The source base station 702 may transmit a handover request 724 to the target base station 706. When the target base station 706 receives the handover request 724, the target base station 706 may determine whether to accept the handover of the UE 704, such as by performing access control. If the target base station 706 determines to accept the handover, the target base station 706 transmits a handover acknowledgement 726 to the source base station 702.

Upon receiving the handover acknowledgement 726, the source base station 702 and the UE 704 may begin handing over the UE 704 to the target base station 706 through handover initiation 732.

In connection with the handover procedure, the UE 704 may detach from the source base station 702 and may synchronize with the target base station 706. The source base station 702 may stop transmitting to the UE 704. In connection with handover of the UE 704, the source base station 702 may transmit a SN status transfer message 734 to the target base station 706. The SN status transfer message 734 may communicate at least one of an uplink delivery status or a downlink delivery status of the UE 704 to the target base station 706, including information indicating, for at least one of an uplink direction to the source base station 702 from the UE 704 or a downlink direction from the source base station 702 to the UE 704, a set of packets that have been delivered, a set of packets that have not been delivered, and the next sequence number of the next packet to be delivered.

According to aspects of FIG. 7, the source base station 702 and the target base station 706 may be configured to maintain continuity of the BSR 712 when the UE 704 is handed over. In so doing, remaining BSR information 735 indicating that data is available at the UE 704 for uplink transmission may be conveyed to the target base station 706 during the handover procedure, for example, as opposed to after the handover procedure where another BSR is transmitted with some redundancy in relation to a BSR transmitted before the handover procedure.

In order to maintain continuity of the BSR 712, the source base station 702 may transmit information to the target base station 706 regarding the data pending uplink transmission at the UE 704. In particular, the source base station 702 may transmit remaining BSR information 735 indicating that a capacity of the allocated set of resources is insufficient for the amount of data indicated in the BSR 712 from the UE 704. Such an indication may indicate that the UE 704 is buffering data pending transmission, and the buffered data has not yet been allocated resources on which the UE 704 may transmit the data. In some aspects, the source base station 702 may include the remaining BSR information 735 in the SN status transfer message 734. In some other aspects, the source base station 702 may include the remaining BSR information 735 in another BSR that indicates an amount of data at the UE 704 for which resources remain to be allocated, a buffer size report, or other remaining BSR information message transmitted to the target base station 706.

Figure 8:
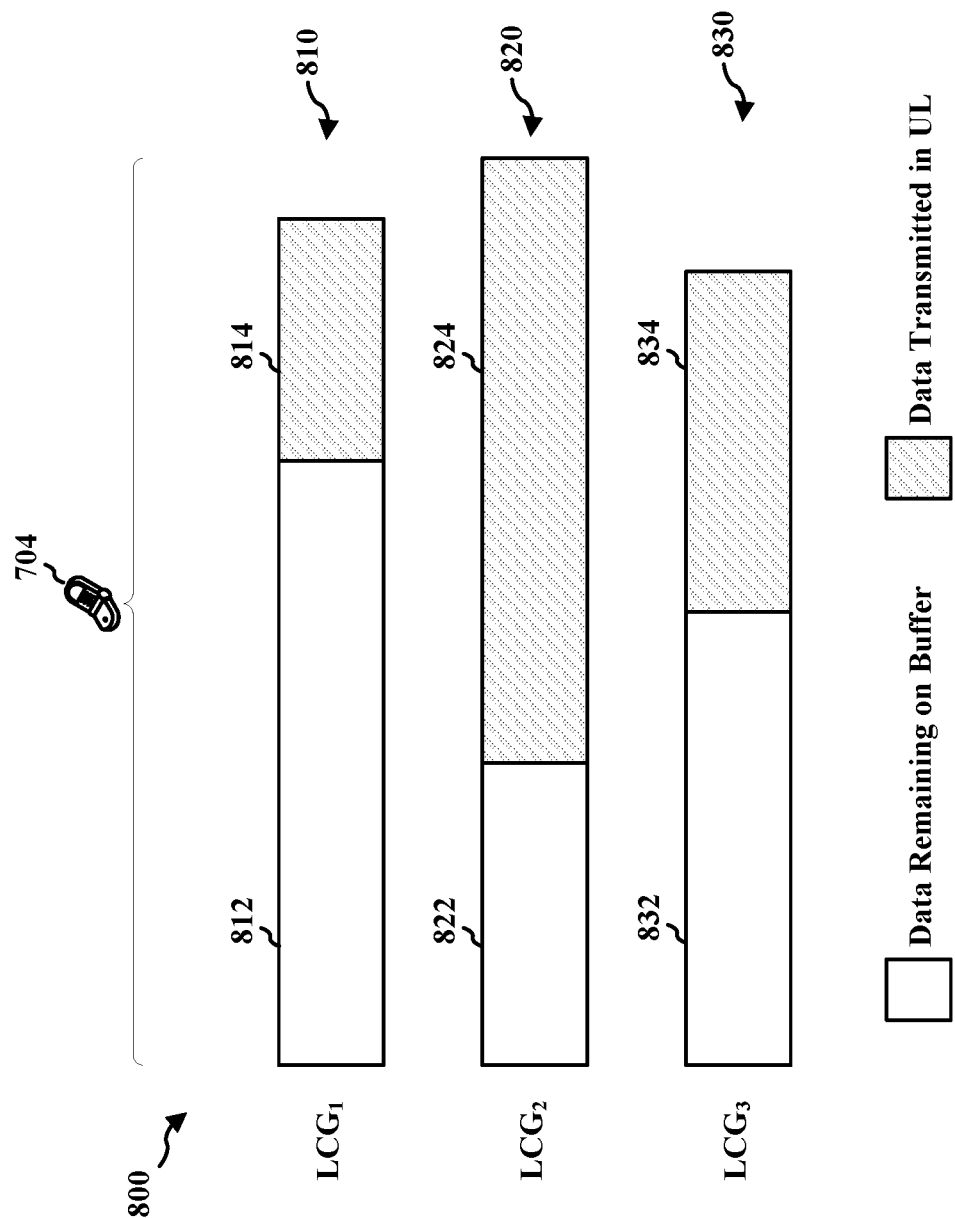
FIG. 8 is a block diagram illustrating example data buffered by a UE that is available for transmission according to at least one uplink grant.

FIG. 8 is a block diagram illustrating example data 800 buffered by the UE 704 that is available for transmission according to at least one uplink grant. In relation to various aspects shown by FIG. 7, the BSR 712 may indicate that the UE 704 is buffering each of a first amount of first data 810 available for uplink transmission, a second amount of second data 820 available for uplink transmission, and a third amount of third data 830 available for uplink. Different portions of each of the buffered data 810, 820, and 830 may be associated with different LCHs, which may be assigned to different portions of each of the buffered data 810, 820, and 830 according to at least one of a DRB, QoS, QCI, delay budget, or another characteristic.

Portions of each of the buffered data 810, 820, and 830 may be differently prioritized relative to other portions of each of the buffered data 810, 820, and 830, and such prioritization may be conveyed through LCHs respectively associated with portions of each of the buffered data 810, 820, and 830. For example, one LCH may be assigned to a DRB at bearer setup, and data to be transmitted on that DRB may be associated with that LCH when buffered by the UE 704 for uplink transmission.

In some aspects, the LCHs may be grouped according to the prioritization of LCHs relative to one another. For example, the LCHs associated with one or more of the highest priorities may be grouped into a first $LCG_1$, the LCHs associated with one or more of the lowest priorities may be grouped into a third $LCG_3$, and the LCHs associated with one or more priorities relatively lower than the one or more highest priorities but relatively higher than the one or more lowest priorities may be grouped into a second $LCG_2$.

As each of the portions of each of the buffered data 810, 820, and 830 may be associated with one of the LCHs grouped into one of the LCGs, each of the portions of each of the buffered data 810, 820, and 830 may be similarly grouped according to relative prioritization. For example, the first data 810 in the first buffer may be associated with the first $LCG_1$ having LCHs of the highest priorities, the third data 830 in the third buffer may be associated with the third $LCG_3$ having LCHs of the lowest priorities, and the second data 820 in the second buffer may be associated with the second $LCG_2$ having LCHs of priorities relatively lower than the highest priorities but relatively higher than the lowest priorities.

The UE 704 may construct or generate the BSR 712 that indicates at least one of the amount of the first data 810, the amount of the second data 830, or the amount of the third data 830. In one example, the UE 704 may construct or generate the BSR 712 as a short truncated BSR (as shown in FIG. 5), which may accommodate one buffer size. Specifically, the UE 704 may include the first amount of the first data 810 in such a short truncated BSR, based on the associated first $LCG_1$ having the highest priority LCHs relative to other LCHs of the other LCGs. Thus, in this other example, the amounts and LCG IDs for the second and third data 820, 830 may not be reported to the source base station 702 in the BSR 712.

In another example illustrated by FIG. 8, the UE 704 may construct or generate the BSR 712 as a long BSR (as shown in FIG. 4). As a long BSR, the BSR 712 may accommodate a respective buffer size that indicates each of the first amount of first data 810, second amount of second data 820, and third amount of third data 830. Further, the BSR 712 may accommodate information indicating the IDs for the LCGs associated with the first, second, and third data 810, 820, and 830.

The UE 704 transmits the BSR 712 to the source base station 702 (such as before the handover initiation 732), thereby information the source base station 702 of one or more of the first amount of first data 810, second amount of second data 820, or third amount of third data 830, as well as a respective LCG ID associated with each of the one or more amounts of the first data 810, second data 820, or third data 830. In the context of the communications flow 700, the source base station 702 may schedule a set of resources on which the UE 704 may transmit a fraction of at least one of the amounts indicated by the BSR 712, but the source base station 702 may not schedule resources for all of the amounts of all of the data indicated by the BSR 712.

For example, the source base station 702 may determine that resources of a sufficient capacity to carry the all of the amounts of the first, second, and third data 810, 820, and 830 are unavailable, such as due to network congestion or other traffic having higher priorities than those associated with the LCHs of the LCGs identified in the BSR 712. In another example, the source base station 702 may determine resources should not be scheduled for all of the amounts of data indicated by the BSR 712 when the source base station 702 determines that the UE 704 is (or is likely) to be handed over to the target base station 706.

Rather, the source base station 702 may schedule a set of resources on which the UE 704 may transmit some of data buffered at the UE 704, but the source base station 702 may allocate a number of resources for the set of resources such that the set of resources has a capacity that is insufficient to carry all of the amounts of the first, second, and third data 810, 820, and 830. By way of illustration and not limitation, a capacity of resources may be an amount of data that can be mapped, assigned, or carried on such resources without violating a constraint on those resources. A constraint may be at least one of practically or physically imposed on resources, such as physical properties of waves may constrain modulation of signals onto waves, or artificially imposed, such as a ceiling or limit imposed upon the size of an uplink grant.

Illustratively, the source base station 702 may allocate the set of resources such that the capacity of the set of resources is sufficient to carry a first section 814 of the first data 810, a second section 824 of the second data 820, and a third section 834 of the third data 830. The source base station 702 may transmit the uplink grant 714 to the UE 704 to indicate the set of resources allocated for the first, second, and third sections 814, 824, and 834 of the first, second, and third data 810, 820, and 830. The UE 704 may receive the uplink grant 714 and, according to the allocated set of resources indicated therein, may assign or modulate the first, second, and third sections 814, 824, and 834 of the first, second, and third data 810, 820, and 830 onto the allocated set of resources for transmission.

In one example, the uplink data 716 may include the transmitted first, second, and third sections 814, 824, and 834 of the first, second, and third data 810, 820, and 830, and the UE 704 may transmit uplink the data 716 to the source base station 702 using the allocated set of resources provided in the uplink grant 714. At the time of the handover decision 722 or handover initiation 732, the UE 704 may still buffer first remaining data section 812 associated with the first $LCG_1$, second remaining data section 822 associated with the second $LCG_2$, and third remaining data section 832 associated with the third $LCG_3$.

As the source base station 702 and the target base station 706 may be configured to maintain continuity of the BSR 712, other resources may be allocated without the UE 704 transmitting another BSR upon handover completion 736. To maintain such BSR continuity, the source base station 702 may transmit to the target base station 706 in association with handover of the UE 704, an indication of the set of resources allocated by the source base station 702 having a capacity that is insufficient for all of the amounts (or total of the amounts) of data indicated by the BSR 712. Such an indication may be or may be included in the remaining BSR information 735, and may be implemented as or in another BSR, a buffer size report, or another message.

According to some aspects, the remaining BSR information 735 may be included in the SN status transfer message 734 that is transmitted to the target base station 706 by the source base station 702 during a handover procedure of the UE 704. For example, a "remaining BSR" information element (IE), which may be an optional information element, may be included in the SN status transfer message 734 to indicate the remaining BSR information 735. According to some other aspects, the source base station 702 may transmit the new BSR to the target base station 706 in a message separate from the SN status transfer message 734. According to some further aspects, the remaining BSR information 735 may be a new BSR. The source base station 702 may generate the new BSR based on the BSR 712 received from the UE 704 and at least one of the capacity of the set of resources scheduled in the uplink grant 714 or the amount of the uplink data 716 received on the set of resources allocated in the uplink grant 714. The new BSR may be an octet string (as described with respect to one of FIG. 4 or FIG. 5).

In some aspects, the remaining BSR information 735 may include information indicating at least one of a first difference between the amount of the first data 810 for which the UE 704 requested resources and the transmitted amount of the first section 814, a second difference between the amount of the second data 820 for which the UE 704 requested resources and the transmitted amount of the second section 824, and a third difference between the amount of the third data 830 for which the UE 704 requested resources and the transmitted amount of the third section 834. Each difference may be associated with one of LCGs having LCHs of one of the first, second, or third data 810, 820, or 830 from which the difference was derived. Thus, the first difference may be associated with the first $LCG_1$, the second difference may be associated with the second $LCG_2$, and the third difference may be associated with the third $LCG_3$. The remaining BSR information 735 may include information indicating each of the LCGs and the association with a respective one of the first, second, and third differences. Accordingly, the priorities of the remaining amounts of the first, second, and third remaining data sections 812, 822, and 832 may be conveyed in the remaining BSR information 735.

While the present disclosure describes aspects of maintaining BSR continuity in which different amounts of data available at the UE for which resources remain to be allocated are associated with different LCGs or LCHs, such amounts of data available at the UE for which resources remain to be allocated may additionally or alternatively be conveyed between base stations with information indicating a respective DRB on which each of the remaining data is transmitted. For example, the source base station 702 may indicate at least one DRB associated with the each of the amounts of the first, second, and third remaining data sections 812, 822, and 832 in the remaining BSR information 735.

In some aspects, the remaining BSR information 735 may be included an IE or other field, which may be associated with or labeled DRBs Subject to Status Transfer. For example, the SN status transfer message 734 may include a list associated with or labeled DRBs Subject to Status Transfer, which may include an item related to each DRB being transferred in the handover of the UE 704, such as information identifying at least one of the uplink status or downlink status for a DRB. In some other aspects, an IE or other field be associated with or labeled DRBs Subject to Status Transfer may include one or more items or IEs that each identifies an amount of one of the first, second, or third data 810, 820, or 830 available for at the UE 704 for a DRB. Such an IE may be optional, and may be an integer or a buffer size report.

In even further aspects, the first, second, and third remaining data sections 812, 822, and 832 may each include one or more remaining data subsections, each of which may be associated with one DRB on which the associated remaining data subsection is transmitted. The source base station 702 may indicate a DRB associated with each amount of each of the remaining data subsections for the first, second, and third remaining data sections 812, 822, and 832 in the remaining BSR information 735. However, the DRBs associated with the first, second, and third data 810, 820, and 830 for which the UE 704 requested resources in the BSR 712 may not be exposed to the source base station 702.

Therefore, the source base station 702 may estimate or approximate each amount of each of the remaining data subsections within the first, second, and third remaining data sections 812, 822, and 832 by subtracting the transmitted amounts of the first, second, and third data sections 814, 824, and 834 from the requested amounts of the first, second, and third data 810, 820, and 830, respectively, and then dividing each difference by the number of DRBs associated with one of the first, second, or third data 810, 820, or 830 used to derive the difference. Each of the quotients derived therefrom may represent the amount of a data subsection remaining on one of the DRBs within one of the first, second, or third data 810, 820, or 830. In other words, an LCG may have LCHs corresponding to N DRBs (such as when each LCH corresponds to one DRB), the UE 704 may indicate an amount X of data available at the UE 704 associated with the LCG in the BSR 712, and the UE 704 may transmit another amount Y of data to the source base station 702 as uplink data 716. The source base station 702 may estimate or approximate the data on each DRB available at the UE 704 as an amount (X−Y)/N of data available for uplink for each DRB having associated data grouped with the LCG. The source base station 702 may transmit information to the target base station 706 indicating that the UE 704 has an amount (X−Y)/N of data available at the UE 704 for each DRB having associated data grouped with the LCG.

In some other aspects, the source base station 702 may indicate amounts of the first, second, and third remaining data sections 812, 822, and 832 at a finer or more granule level than the LCG level. That is, the source base station 702 may indicate an amount of each of a set of subsections into which each of the first, second, and third remaining data sections 812, 822, and 832 is divided. Each of the subsections of each of the first, second, and third remaining data sections 812, 822, and 832 may be associated with a respective one of the LCHs. In other words, the remaining BSR information 735 may include information indicating a respective amount of remaining data for each of the LCHs.

However, while the BSR 712 may convey IDs of LCGs having LCHs associated with the first, second, and third data 810, 820, and 830 buffered at the UE 704, the BSR 712 may lack information indicating the LCHs. Therefore, at least one of the source base station 702 or the target base station 706 may map each of the LCGs to a set of LCHs, with each of the LCHs being associated with a subsection of the one of the first, second, or third data 810, 820, or 830.

In some examples, the target base station 706 may configure mapping of LCGs to sets of LCHs, as the target base station 706 may reconfigure which LCHs are grouped together in which LCGs. The target base station 706 may transmit the mapping to the source base station 702 so that the source base station 702 is informed of how LCHs are grouped in LCGs at the base station providing the next uplink grant for the UE 704.

In some other examples, the source base station 702 may configure mapping of LCGs to sets of LCHs, such as when the source base station 702 fails to receive or is unable to interpret a mapping of LCGs to sets of LCHs received from the target base station 706. In some aspects, the mapping of LCHs to LCGs at the source base station 702 may be different than the mapping of LCHs to LCGs at the target base station 706, such as when a first LCH and a second LCH are both in a first LCG according to the source base station 702 but are in different LCGs at the target base station 706. The source base station 702 may use a mapping of LCGs to sets of LCHs to estimate or approximate amounts of remaining data subsections associated with LCHs for which resources have not yet been allocated. For example, the source base station 702 may use a mapping of LCGs to sets of LCHs to estimate or approximate the data available at the UE 704 on each N LCHs in an LCG according to the formula (X−Y)/N, with X being an amount of data available at the UE 704 associated with the LCG, and Y being an amount of data transmitted to the source base station 702 as uplink data 716.

As the UE 704 does not expose the amounts of the first, second, and third data 810, 820, and 830 separated at an LCH level at which each amount associated with LCH can be discernible, the source base station 702 may estimate or approximate each amount of each of the remaining data subsections within the first, second, and third remaining data sections 812, 822, and 832. To do so, the source base station 702 may preliminarily subtract the transmitted amounts of the first, second, and third data sections 814, 824, and 834 from the requested amounts of the first, second, and third data 810, 820, and 830, respectively, in order to derive the amounts of the first, second, and third remaining data sections 812, 822, and 832 because the source base station 702 does not otherwise have a mechanism to retrieve that information from the UE 704.

The source base station 702 may divide each difference by the number of LCHs associated with one of the first, second, or third data 810, 820, or 830 used to calculate the difference. Each of the quotients derived therefrom may represent the amount of a remaining data subsection associated with one LCH within one of the first, second, or third data 810, 820, or 830. The source base station 702 may indicate, in the remaining BSR information 735, an LCH associated with each amount of each of the remaining data subsections estimated or approximated to be a quotient.

In other words, an LCG may have N LCHs grouped therein, the UE 704 may indicate an amount X of data available at the UE 704 associated with the LCG in the BSR 712, and the UE 704 may transmit another amount Y of data to the source base station 702 as uplink data 716. The source base station 702 may estimate or approximate the data associated with each of the N LCHs available at the UE 704 is associated with an amount (X−Y)/N of data remaining to be transmitted for each LCH grouped into the LCG. The source base station 702 may transmit information to the target base station 706 indicating that the UE 704 has an amount (X−Y)/N of data available at the UE 704 for each LCH grouped into the LCG.

After the source base station 702 transmits the SN status transfer message 734 and the remaining BSR information 735 to the target base station 706, handover completion 736 of the UE 704 may occur. Upon handover completion 736, the UE 704 may transmit a BSR to the target base station 706 in order to obtain resources for the remaining data sections 812, 822, and 832. However, before the BSR is transmitted by the UE 704 (or received by the target base station 706), the target base station 706 may schedule uplink resources for the remaining data sections 812, 822, and 832 at the UE 704 based on remaining BSR information 735 received from the source base station 702. The target base station 706 may schedule resources for some or all of the remaining data sections 812, 822, and 832. Because the target base station 706 receives the remaining BSR information 735, which may indicate the amounts of the remaining data sections 812, 822, and 832, the target base station 706 may schedule a suitable number of resources on which the UE 704 may transmit the remaining data sections 812, 822, and 832, and avoid wasting resources or other network inefficiencies.

The target base station 706 may transmit an uplink grant 744 to the UE 704 (such as before receiving a BSR from the UE 704), with the uplink grant 744 indicating the resources scheduled by the target base station 706 according to the remaining BSR information 735. The UE 704 may receive the uplink grant 744 and may transmit the uplink data 746 to the target base station 706, which may include the remaining data sections 812, 822, and 832. Because the target base station 706 scheduled uplink resources for the UE 704 and transmitted the uplink grant 744 to the UE 704 without waiting for a BSR from the UE 704, the UE 704 may reduce or avoid delay in uplink transmission after the handover completion 736.

In some aspects, when scheduling uplink resources for the UE 704 based on the information about the data remaining on the UE 704, the target base station 706 may determine a scheduling priority based on the information about the remaining data sections 812, 822, and 832 at the UE 704. For example, each LCG may be associated with at least one of a QoS, QCI, delay budget, or other characteristic according to which LCGs can be prioritized relative to one another. The target base station 706 may determine such a characteristic (such as QoS) associated with the LCGs for which the UE 704 has one of the remaining data sections 812, 822, and 832, and may determine the scheduling priority for the uplink grant 744 based on the respective characteristics associated with the LCGs of the remaining data sections 812, 822, and 832.

Figure 9:
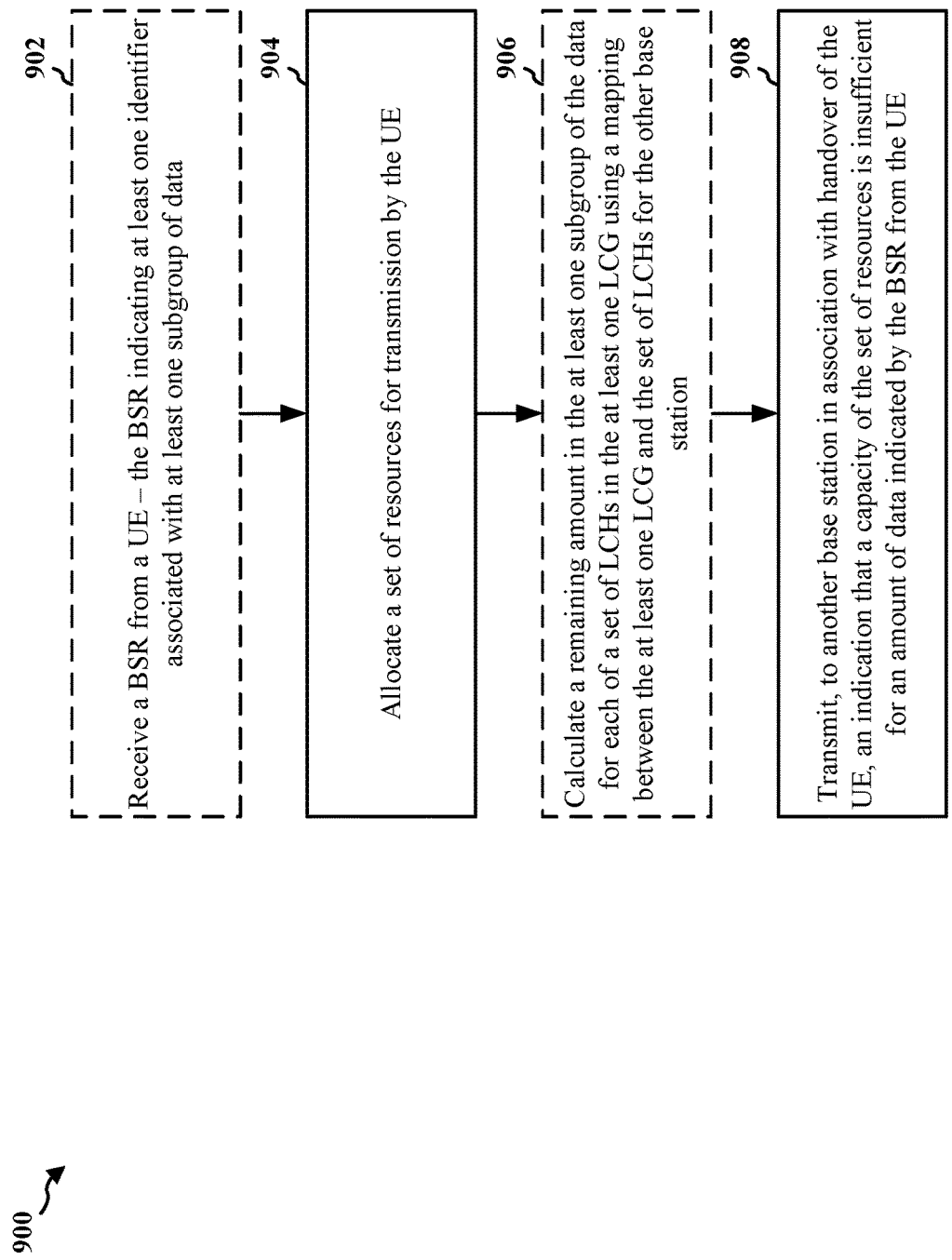
FIG. 9 is a flowchart of an example method of wireless communication by a base station.

FIG. 9 is a flowchart of an example method of wireless communication by a base station. The method 900 may be performed by a base station (such as the base station 102/180, the base station 310, or the source base station 702) or other apparatus (such as the apparatus 1302). For example, the method 900 may be implemented by a base station considered to be the source base station in association with handover of a UE to a target base station. According to various aspects of the method 900, one or more of the illustrated operations may be transposed, omitted, or contemporaneously performed.

At 902, the base station may receive a BSR from a UE. The BSR may indicate at least one ID associated with at least one subgroup of data. For example, the BSR may indicate at least one amount of at least one subgroup of data that the UE requests to be scheduled by the base station, and the BSR may further indicate the an ID associated with the at least one amount of at least one subgroup of data. In some aspects, the at least one ID may identify an LCG associated with the at least one subgroup of data, such as an LCG ID. In some other aspects, the at least one ID may identify a DRB associated with the at least one subgroup of data. In some aspects, the BSR may be one of a long BSR or a long truncated BSR, and in such aspects, the at least one subgroup of the data may include at least two subgroups of data. In some other aspects, the BSR may be one of a short BSR or a short truncated BSR, and in such aspects, the at least one subgroup of the data may include one subgroup of data.

In the context of FIGS. 7 and 8, the source base station 702 may receive the BSR 712 from the UE 704. The BSR 712 may indicate a request of the UE 704 to be allocated resources for transmission of data that is grouped into one of the first data 810, the second data 820, and the third data 830. For example, each of the first data 810, the second data 820, and the third data 830 may be a subgroup of the data available for transmission by the UE 704. In some aspects, the BSR 712 may be one of a long BSR or a long truncated BSR, and in such aspects, the BSR 712 may indicate a request for resources to be allocated for a first amount of the first data 810, a second amount of the second data 820, and a third amount of the third data 830. In some other aspects, the BSR 712 may be one of a short BSR or a short truncated BSR, and in such aspects, the BSR 712 indicate request for resources to be allocated for a first amount of the first data 810.

At 904, the base station allocates a set of resources for transmission by the UE. The set of resources may have a capacity that is insufficient for an amount of data indicated by the BSR from the UE. For example, first, the base station may identify a set of resources that is open or has no other transmissions scheduled thereon, and second, the base station may schedule transmission of a section of at least one subgroup of the data on the set of resources, which may reserve the set of resources for transmission of data by the UE or prevent the resources from being reallocated to another UE or device.

In the context of FIGS. 7 and 8, the source base station 702 may allocate a set of resources for transmission by the UE 704 upon receiving the BSR 712. In some aspects, the source base station 702 may allocate a set of resources for transmission by the UE of at least one of a first data section 814 of the first data 810, a second data section 824 of the second data 820, and a third data section 834 of the third data 830.

At 906, the base station may calculate a remaining amount in at least one subgroup of the data for each of a set of LCHs in at least one LCG using a mapping between the at least one LCG and the set of LCHs for the other base station. In some aspects, the base station may receive the mapping between the at least one LCG and the set of LCHs from the other base station. In some other aspects, the base station may estimate or approximate the mapping between the at least one LCG and the set of LCHs from the other base station, such as when the base station does not receive the mapping from the other base station. In some aspects, the base station may calculate the remaining amount in at least one subgroup of data for each of a set of LCHs in at least one LCG by, first, identifying, from the mapping, which LCHs (or DRBs) map to one LCG at the other base station. Second, the base station may subtract an amount of data received from the UE on the allocated set of resources from another amount of data being buffered by the UE pending transmission (as indicated by the BSR), and this difference may correspond to (or may be approximately equal to) the remaining amount of data buffered by the UE pending transmission. Third, the base station may divide the difference by the number of LCHs (or DRBs), and the quotient may represent an estimation or approximation of the remaining amount of data buffered by the UE on each of the LCHs of the LCG (or each of the DRBs).

In the context of FIGS. 7 and 8, the source base station 702 may calculate an amount of each remaining data subsection within at least one of the first, second, and third remaining data sections 812, 822, and 832 using a mapping between the at least one $LCG_1$ (having the first data 810), $LCG_2$ (having the second data 820), or $LCG_3$ (having the third data 830) and a set of data subsections, each of which may correspond to an LCH (or DRB).

At 908, the base station transmits to another base station in association with handover of the UE, an indication that a capacity of the set of resources is insufficient for an amount of data indicated by a BSR from the UE. In some aspects, the indication that the capacity of the set of resources is insufficient for the amount of the data indicated by the BSR may be included in at least one of a SN status transfer message, another BSR, or a buffer size report.

In some aspects, the indication that the capacity of the set of resources is insufficient for the amount of the data indicated by the BSR may indicate at least one amount of the at least one subgroup of the data for which resources remain to be allocated. In some other aspects, the indication that the capacity of the set of resources is insufficient for the amount of the data indicated by the BSR may indicate a difference between the amount of the data indicated by the BSR and another amount of data for which the set of resources is allocated.

In some aspects, the indication that the capacity of the set of resources is insufficient for the amount of the data indicated by the BSR may indicate each remaining amount in the at least one subgroup of the data for each of the set of LCHs in the at least one LCG.

In the context of FIGS. 7 and 8, the source base station 702 may transmit, to the target base station 706 in association with handover of the UE 704, the remaining BSR information 735, which may indicate that the set of resources allocated by the source base station 702 has a capacity that is insufficient for the amounts of the first data 810, the second data 820, and the third data 830 indicated by the BSR 712. In some aspects, the remaining BSR information 735 may include or may be included in at least one of a SN status transfer message, another BSR, or a buffer size report.

Figure 10:
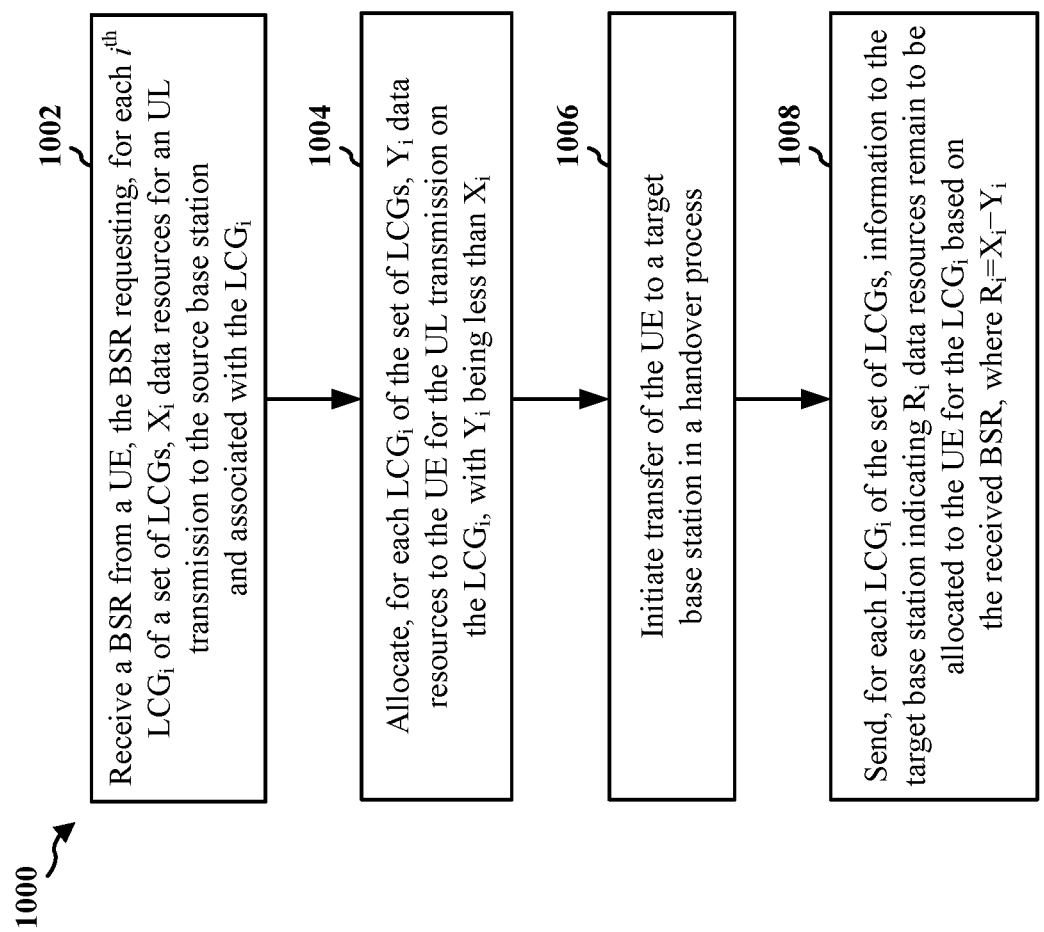
FIG. 10 is a flowchart of another example method of wireless communication by a base station.

FIG. 10 is a flowchart of another method of wireless communication by a base station. The method 1000 may be performed by a base station (such as the base station 102/180, the base station 310, or the source base station 702) or other apparatus (such as the apparatus 1302). For example, the base station may be considered the source base station in association with handover of a UE to a target base station. According to various aspects of the method 1000, one or more of the illustrated operations may be transposed, omitted, or contemporaneously performed.

At 1002, the source base station may receive a BSR from a UE. The BSR may request, for each $i^{th}$ logical channel group ($LCG_i$) of a set of LCGs, X data resources for an uplink transmission to the source base station and associated with the $LCG_i$, where $1=1, 2, \ldots, N$, and N is the number of LCGs in the set of LCGs. For example, as described above with respect to FIG. 7, the source base station 702 may receive the BSR 712 from the UE 704. The data resources may be in bytes. The BSR may be a short BSR or a short truncated BSR and N may equal 1. The BSR may be a long BSR or a long truncated BSR and N may be greater than or equal to 2. For example, as described above with respect to FIG. 7, the source base station 702 may schedule resources for uplink for the UE 704, and may transmit the uplink grant 714 to the UE 704 identifying the resources.

At block 1004, the source base station may allocate, for each $LCG_i$ of the set of LCGs, $Y_i$ data resources to the UE for the uplink transmission on the $LCG_i$, with $Y_i$ being less than $X_i$. In some aspects, the source base station may allocate the $Y_i$ data resources to have a capacity that is insufficient for the amount of data indicated in the BSR from the UE. For example, the $Y_i$ data resources may be less than the $X_i$ data resources sufficient to carry data that the UE is requesting to transmit in the BSR. The source base station may transmit an uplink grant indicating the allocated $Y_i$ data resources to the UE, and the source base station may receive data from the UE carried on allocated the $Y_i$ data resources.

For example, as described above with respect to FIG. 7, the source base station 702 receive a BSR 712 from the UE 704.

At 1006, the source base station may initiate transfer of the UE to a target base station in a handover process. For example, the source base station may determine that the UE is to be handed over to the target base station, and the source base station may transmit a handover request to the target base station. The source base station may receive an acknowledgement from the target base station in response to the handover request, and the source base station may transmit some information associated with the UE to the target base station upon receiving the acknowledgement. For example, as described above with respect to FIG. 7, the source base station 702 may make a handover decision 722.

At 1008, the source base station may transmit information to the target base station that indicates, for each $LCG_i$ of the set of LCGs, $R_i$ data resources remain to be allocated to the UE for the $LCG_i$ based on the received BSR, where $R_i=X_i-Y_i$. The set of LCGs may include LCGs $LCG_i$ where $R_i$ is greater than zero. The information may be sent to the target base station within a SN status transfer message. The information may be sent to the target base station in a second BSR. The information may be sent to the target base station in a buffer size report. Each LCG may include a set of M LCHs, and the information to the target base station may indicating data resources that remain to be allocated to the UE may include information indicating data resources that remain to be allocated for each LCH of the set of M LCHs associated with the LCG. The information to the target base station for an $LCG_i$ may indicate that RIM data resource remain to be allocated for each LCH of the set of M LCHs. For example, as described above with respect to FIG. 7, the source base station 702 may send the remaining BSR information 735 to the target base station 706 indicating each amount of data remaining to be transmitted by the UE 704.

In some aspects, the source base station may determine an LCG to LCH mapping configuration for the target base station. The information sent to the target base station may be based on the determined LCG to LCH mapping configuration.

Figure 11:
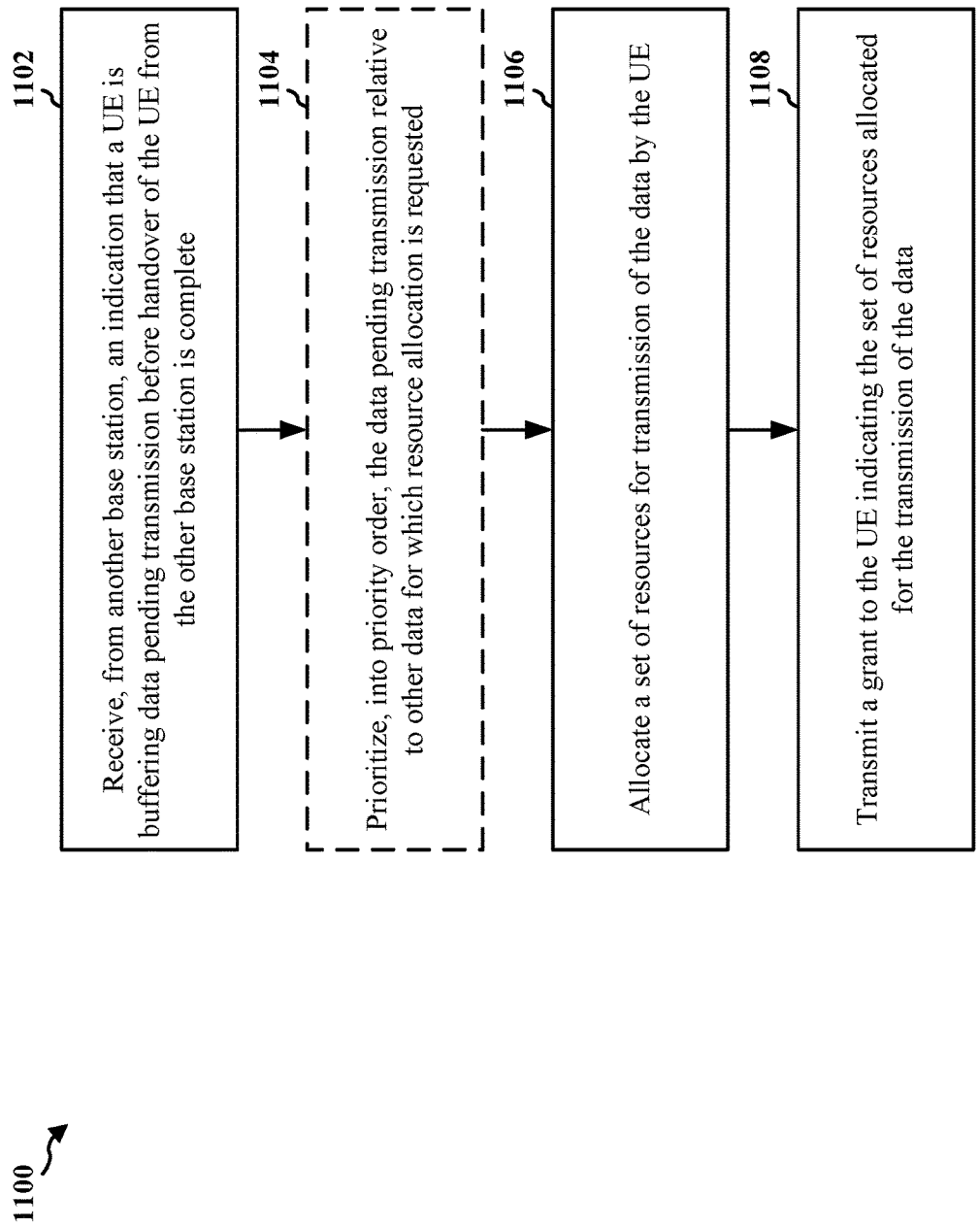
FIG. 11 is a flowchart of an example method of wireless communication by another base station.

FIG. 11 is a flowchart of a method 1100 of wireless communication by another base station. The method 1100 may be performed by a base station (such as the second base station 102/180', the base station 310, or the target base station 706) or other apparatus (such as the apparatus 1402). For example, the method 1100 may be implemented by a base station considered to be the target base station in association with handover of a UE from a source base station. According to various aspects of the method 1100, one or more of the illustrated operations may be transposed, omitted, or contemporaneously performed.

At 1102, the base station receives, from another base station, an indication that the UE is buffering data pending transmission before handover of the UE from the other base station is complete. For example, the indication that the UE is buffering data pending transmission may indicate at least one amount of at least a portion of the data that is associated with at least one subgroup. In another example, the indication that the UE is buffering data pending transmission may indicate at least one ID associated with the at least one subgroup of the data.

In some aspects, the at least one ID identifies at least one LCG associated with the at least one subgroup of the data. In some further aspects, the indication that the UE is buffering data pending transmission may indicate a respective remaining amount of a portion of the data for each of a set of LCHs to which the at least one LCG maps.

In some other aspects, the at least one ID identifies at least one DRB associated with the at least one subgroup of the data. In some aspects, the indication that the UE is buffering data pending transmission may indicate a difference between a first amount of data of the UE indicated by a BSR and a second amount of data for which another set of resources is allocated by the other base station. In some other aspects, the indication that the UE is buffering data pending transmission may be included in at least one of a SN status transfer message, a BSR, or a buffer size report.

In the context of FIGS. 7 and 8, the target base station 706 may receive, from the source base station 702, the remaining BSR information 735 before handover completion 736. The remaining BSR information 735 may indicate that at least one of the first remaining data section 812 of the first data 810, the second remaining data section 822 of the second data 820, or the third remaining data section 832 of the third data 830 is buffered by the UE 704 pending transmission. In some aspects, the remaining BSR information 735 may include or may be included in at least one of a SN status transfer message, a BSR, or a buffer size report.

At 1104, the base station may prioritize, into priority order, the data pending transmission relative to other data for which resource allocation is requested. For example, the base station may identify a priority associated with the data pending transmission being buffered by the UE, such as a priority of an LCG associated with the data at the UE, a priority of a DRB associated with the data at the UE, or a priority of an LCH in the LCG associated with the data at the UE. The indication that the UE is buffering data pending transmission, received from the other base station, may indicate the LCG, LCH, or DRB and, in some aspects, may indicate the data buffered by the UE includes a first dataset corresponding to one LCG of a higher priority and includes a second data set corresponding to another LCG of a lower priority. Accordingly, the base station may prioritize the first dataset over the second dataset (potentially with some other data intervening between the first and second datasets when arranged in priority order), and so, the base station may differently prioritize different amounts of different data for resource allocation. The base station also may identify one or more other priorities associated with other data for which other UEs are requesting resource allocations. Further, the base station may compare the priority associated with the data buffered by the UE with the one or more other priorities associated with the other data for which resource allocation is requested. Based on the comparisons, the base station may order different data for which resource allocations are requested in a priority order according to the priorities relative to one another, such as in descending order of highest priority to lowest priority.

In the context of FIGS. 7 and 8, the target base station 706 may prioritize, into priority order, data buffered by the UE 704 pending transmission relative to other for which resource allocation is requested. The target base station 706 may prioritize transmission by the UE 704 relative to the one or more other transmissions using the remaining BSR information 735, such as an LCG, DRB, or LCH indicated in the remaining BSR information 735.

At 1106, the base station allocates a set of resources for transmission of the data by the UE. For example, first, the base station may identify a set of resources that is open or has no other transmissions to the base station scheduled thereon, and second, the base station may schedule transmission of a section of at least one subgroup of the data on the set of resources, which may prevent the resources from being reallocated to another UE or device. The base station may allocate the set of resources for transmission of the data in absence of a BSR from the UE. For example, the base station may allocate resources for the UE before handover of the UE from the other base station is complete, and therefore, the UE may lack an opportunity to transmit a BSR to the base station before the base station allocates resources. However, the base station may be informed by the other base station of at least one amount of data for which to allocated resources, such as through the indication that the UE is buffering data pending transmission. In some aspects, the base station may allocate the set of resources for transmission of the data by the UE according to the priority order. For example, the base station may sort the priority order in a descending order of highest priority to lowest priority, and the base station may allocate resources for data associated with a higher priority before allocating resources for data associated with a lower priority.

In some other aspects, the base station may allocate the set of resources using a set of LCHs. For example, the UE may have at least one subgroup of data for which resources remain to be allocated, and the at least one subgroup may be associated with an LCG. The LCG may have a set of LCHs, each of which may be associated with at least a portion of the subgroup of the data. The base station may receive the indication that the UE is buffering data pending transmission, which may include one remaining amounts of at least one subgroup of data for each of the set of LCHs to which the LCG maps.

In the context of FIGS. 7 and 8, the target base station 706 may allocate a set of resources for transmission of at least some of the remaining data at the UE 704. For example, the target base station 706 may allocate a set of resources for transmission of at least one of a first remaining data section 812 of the first data 810, a second remaining data section 822 of the second data 820, and a third remaining data section 832 of the third data 830.

At 1108, the base station transmits a grant to the UE indicating the set of resources allocated for the transmission of the data. Accordingly, the base station may inform the UE of the set of resources on which the UE may transmit buffered data. The base station may do so without relying on a BSR from the UE, which may reduce the latency in data transmission by the UE incurred by handover of the UE.

In the context of FIGS. 7 and 8, the target base station 706 may transmit the grant 744 to the UE 704 indicating the set of resources allocated for the transmission. For example, the grant 744 may indicate the set of resources allocated by the target base station 706 for transmission of at least one of a first remaining data section 812 of the first data 810, a second remaining data section 822 of the second data 820, or a third remaining data section 832 of the third data 830.

Figure 12:
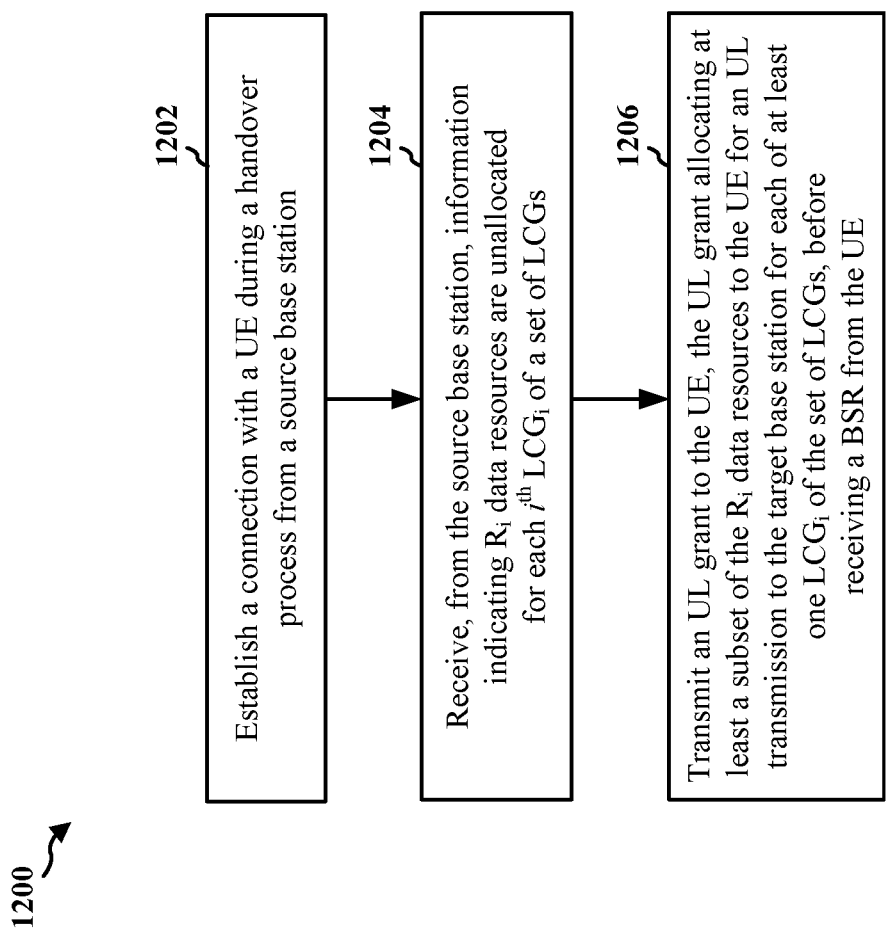
FIG. 12 is a flowchart of another example method of wireless communication by another base station.

FIG. 12 is a flowchart of another method 1200 of wireless communication by another base station. The method 1200 may be performed by a base station (such as the base station 102/180, the base station 310, or the target base station 706) or other apparatus (such as the apparatus 1402). For example, the base station considered to be the target base station in association with handover of a UE from a source base station. According to various aspects of the method 1200, one or more of the illustrated operations may be transposed, omitted, or contemporaneously performed.

At 1202, the target base station may establish a connection with a UE during a handover process from a source base station. For example, as described above with respect to FIG. 7, the target base station 706 may establish a connection with the UE 704 via the handover process (such as at handover completion 736).

At 1204, the target base station may receive, from the source base station, information indicating $R_i$ data resources are unallocated for each $i^{th}$ logical channel group ($LCG_i$) of a set of LCGs. The data resources may be in bytes. The information may be received from the source base station in a SN status transfer message. The information may be received from the source base station in a BSR for the UE. The BSR may be a short BSR or a short truncated BSR, and the set of LCGs may include one LCG. The BSR may be a long BSR or a long truncated BSR, and the set of LCGs may include two or more LCGs. The information may be received from the source base station in a buffer size report. Each LCG may include a set of M LCHs, and the information from the source base station indicating data resources that remain to be allocated to the UE may include information indicating data resources that remain to be allocated for each LCH of the set of M LCHs associated with the LCG. The information from the source base station for an $LCG_i$ may indicate that RIM data resources remain to be allocated for each LCH of the set of M LCHs. The information received from the source base station may be based on an LCG to LCH mapping configuration for the target base station. For example, as described above with respect to FIG. 7, the target base station 706 may receive the remaining BSR information 735 from the source base station 702 indicating each amount of data remaining to be transmitted by the UE 704.

At 1206, the target base station may transmit an uplink grant to the UE before receiving a BSR from the UE. The uplink grant may allocate at least a subset of the data resources to the UE for an uplink transmission to the target base station for each of at least one $LCG_i$ of the set of LCGs. For example, as described above with respect to FIG. 7, the target base station 706 may transmit the uplink grant 744 to the UE 704.

In some aspects, the target base station may determine an uplink scheduling priority associated with the uplink grant for the UE based on the received information. The uplink grant may be based on the determined uplink scheduling priority for the UE.

Figure 13:
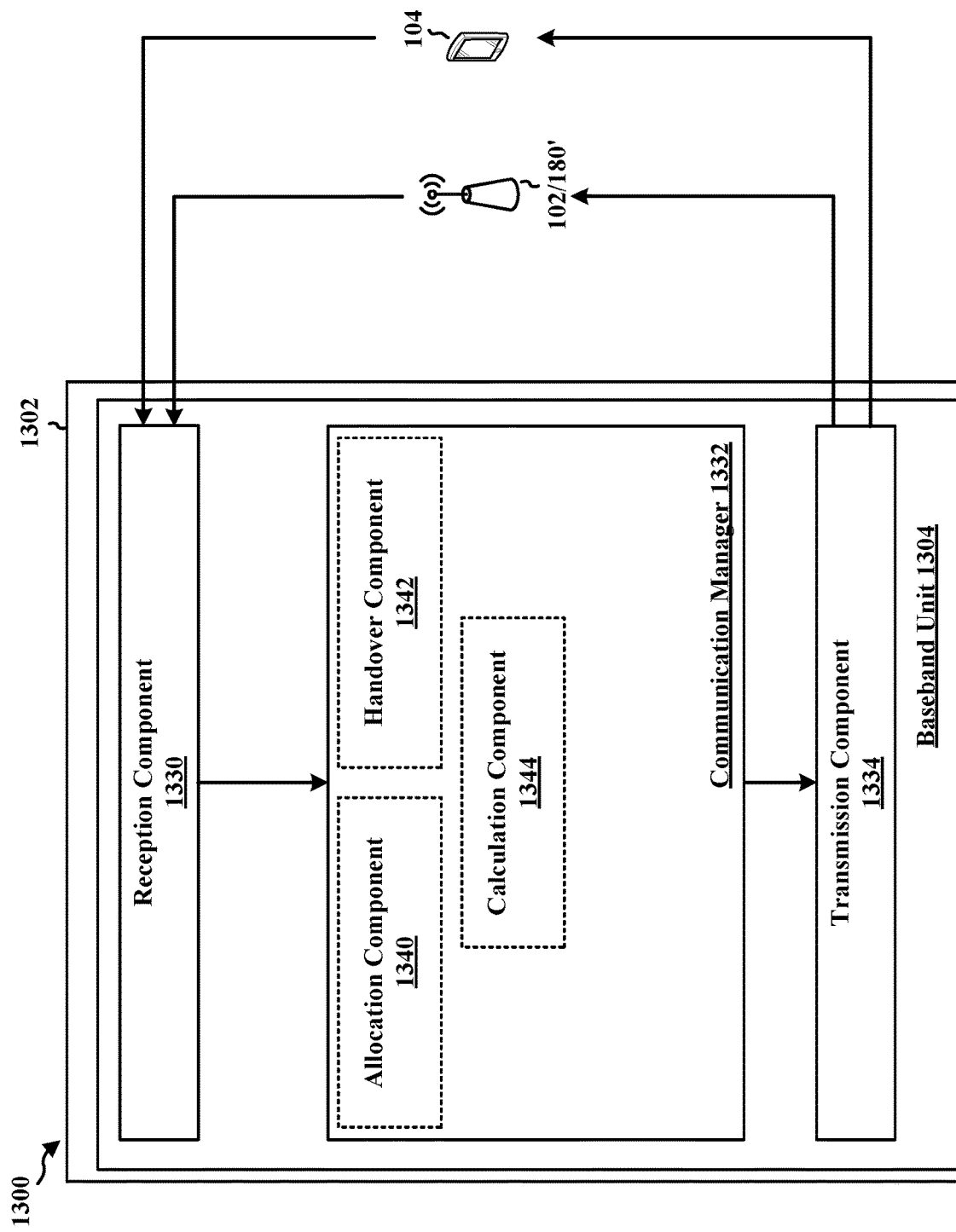
FIG. 13 is a diagram illustrating an example of a hardware implementation for an example apparatus.

FIG. 13 is a diagram 1300 illustrating an example of a hardware implementation for an apparatus 1302. The apparatus 1302 is a base station and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described herein. The computer-readable medium/memory also may be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory or configured as hardware within the baseband unit 1304. The baseband unit 1304 may be a component of the base station 310 and may include the memory 376 or at least one of the TX processor 316, the RX processor 370, and the controller/processor 375.

The apparatus 1302 may receive information from at least one of a UE 104 or a base station 102/180' using the reception component 1330. Additionally or alternatively, the apparatus 1302 may transmit information to at least one of the UE 104 or the base station 102/180' using the transmission component 1334. The reception component 1330 may provide received information to the communication manager 1332, and transmission component 1334 may be provided information to be transmitted from the communication manager 1332.

The reception component 1330 may receive a BSR from the UE 104, such as described in connection with 902 of FIG. 9 or 1002 of FIG. 10. In some aspects, The BSR may indicate at least one ID associated with at least one subgroup of data. For example, the BSR may indicate at least one amount of at least one subgroup of data that the UE 104 requests to be scheduled by the apparatus 1302, and the BSR may further indicate an ID associated with the at least one amount of at least one subgroup of data. In some aspects, the at least one ID may identify an LCG associated with the at least one subgroup of data, such as an LCG ID. In some other aspects, the at least one ID may identify a DRB associated with the at least one subgroup of data. In some aspects, the BSR may be one of a long BSR or a long truncated BSR, and in such aspects, the at least one subgroup of the data includes at least two subgroups of data. In some other aspects, the BSR may be one of a short BSR or a short truncated BSR, and in such aspects, the at least one subgroup of the data may include one subgroup of data.

The communication manager 1332 may include an allocation component 1340 that receives input(s) from the reception component 1330 of the BSR from the UE 104. The allocation component 1340 may be configured to allocate a set of resources for transmission by the UE 104, such as described in connection with 904 of FIG. 9 or 1004 of FIG. 10. However, the set of resources may be allocated with a capacity that is insufficient for an amount of data indicated by a BSR from the UE 104. Thus, at least one amount of the at least one subgroup of data may remain buffered at the UE 104 until scheduled.

The communication manager 1332 may further include a handover component 1342 that is configured to perform a handover procedure of the UE 104 to the base station 102/180'. The handover component 1342 may be configured to determine to transfer the UE 104 to the base station 102/180' in a handover process, such as described in connection with 1006 of FIG. 10. For example, the handover component 1342 may be configured to make a handover decision as to whether the UE 104 is to be handed over to the base station 102/180'. Further, the handover component 1342 may generate a handover request that may be transmitted to the base station 102/180' to request that the UE 104 be handed over from the apparatus 1302 to the base station 102/180'.

The communication manager 1332 may further include a calculation component 1344 that may be configured to calculate a respective remaining amount in the at least one subgroup of the data for each of a set of LCHs in the at least one LCG using a mapping between the at least one LCG and the set of LCHs for the base station 102/180', such as described in connection with 906 of FIG. 9.

The transmission component 1334 may receive inputs from the communication manager 1332, which may indicate the set of resources allocated for the at least one subgroup of data buffered at the UE 104, the BSR, the handover procedure of the UE 104, and the calculated remaining amount of the at least one subgroup of the data. The transmission component 1334 may be configured to transmit, to the base station 102/180' in association with handover of the UE 104, an indication that the capacity of the set of resources is insufficient for the amount of the data indicated by the BSR, such as described in connection with 908 of FIG. 9 or 1008 of FIG. 10. In some aspects, the indication that the capacity of the set of resources is insufficient for the amount of the data indicated by the BSR may be included in at least one of a SN status transfer message, another BSR, or a buffer size report.

In some aspects, the indication that the capacity of the set of resources is insufficient for the amount of the data indicated by the BSR may indicate at least one amount of the at least one subgroup of the data for which resources remain to be allocated. In some other aspects, the indication that the capacity of the set of resources is insufficient for the amount of the data indicated by the BSR may indicate a difference between the amount of the data indicated by the BSR and another amount of data for which the set of resources is allocated. For example, the other amount of data may be an amount of data received by reception component 1330 on the set of resources allocated by the allocation component 1340. In some other aspects, the indication that the capacity of the set of resources is insufficient for the amount of the data indicated by the BSR may indicate one remaining amount in the at least one subgroup of the data for each of the set of LCHs that map to the at least one LCG.

The apparatus 1302 may include additional components that perform some or all of the blocks, operations, signaling, etc. of the algorithm(s) in the aforementioned call flow diagram and flowcharts of FIGS. 7, 9, and 10. As such, some or all of the blocks, operations, signaling, etc. in the aforementioned call flow diagram and flowcharts of FIGS. 7, 9, and 10 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for allocating a set of resources for transmission by a UE; and means for transmitting, to another base station in association with handover of the UE, an indication that a capacity of the set of resources is insufficient for an amount of data indicated by a BSR from the UE.

In one configuration, the apparatus 1302, and in particular the baseband unit 1304, includes may further include means for receiving the BSR from the UE, the BSR indicating at least one identifier associated with at least one subgroup of the data.

In one configuration, the indication that the capacity of the set of resources is insufficient for the amount of the data indicated by the BSR indicates at least one amount of the at least one subgroup of the data for which resources remain to be allocated.

In one configuration, the means for allocating a set of resources for transmission by a UE is configured to allocate the set of resources with a capacity that is insufficient for the amount of the data indicated by the BSR from the UE. In one configuration, the at least one identifier identifies at least one LCG associated with the at least one subgroup of the data.

In one configuration, the apparatus 1302, and in particular the baseband unit 1304, includes may further include means for calculating a remaining amount in the at least one subgroup of the data for each of a set of LCHs in the at least one LCG using a mapping between the at least one LCG and the set of LCHs for the other base station, and the indication that the capacity of the set of resources is insufficient for the amount of the data indicated by the BSR indicates one remaining amount in the at least one subgroup of the data for each of the set of LCHs that maps to the at least one LCG.

In one configuration, the at least one identifier identifies at least one DRB associated with the at least one subgroup of the data.

In one configuration, the BSR includes at least one of a long BSR or a long truncated BSR, and the at least one subgroup of the data includes at least two subgroups of the data.

In one configuration, the BSR includes at least one of a short BSR or a short truncated BSR.

In one configuration, the indication that the capacity of the set of resources is insufficient for the amount of the data indicated by the BSR indicates a difference between the amount of the data indicated by the BSR and another amount of data for which the set of resources is allocated.

In one configuration, the indication that the capacity of the set of resources is insufficient for the amount of the data indicated by the BSR is included in at least one of a SN status transfer message, another BSR, or a buffer size report.

The aforementioned means may be one or more of the aforementioned components of the apparatus 1302 configured to perform the functions recited by the aforementioned means. As described herein, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
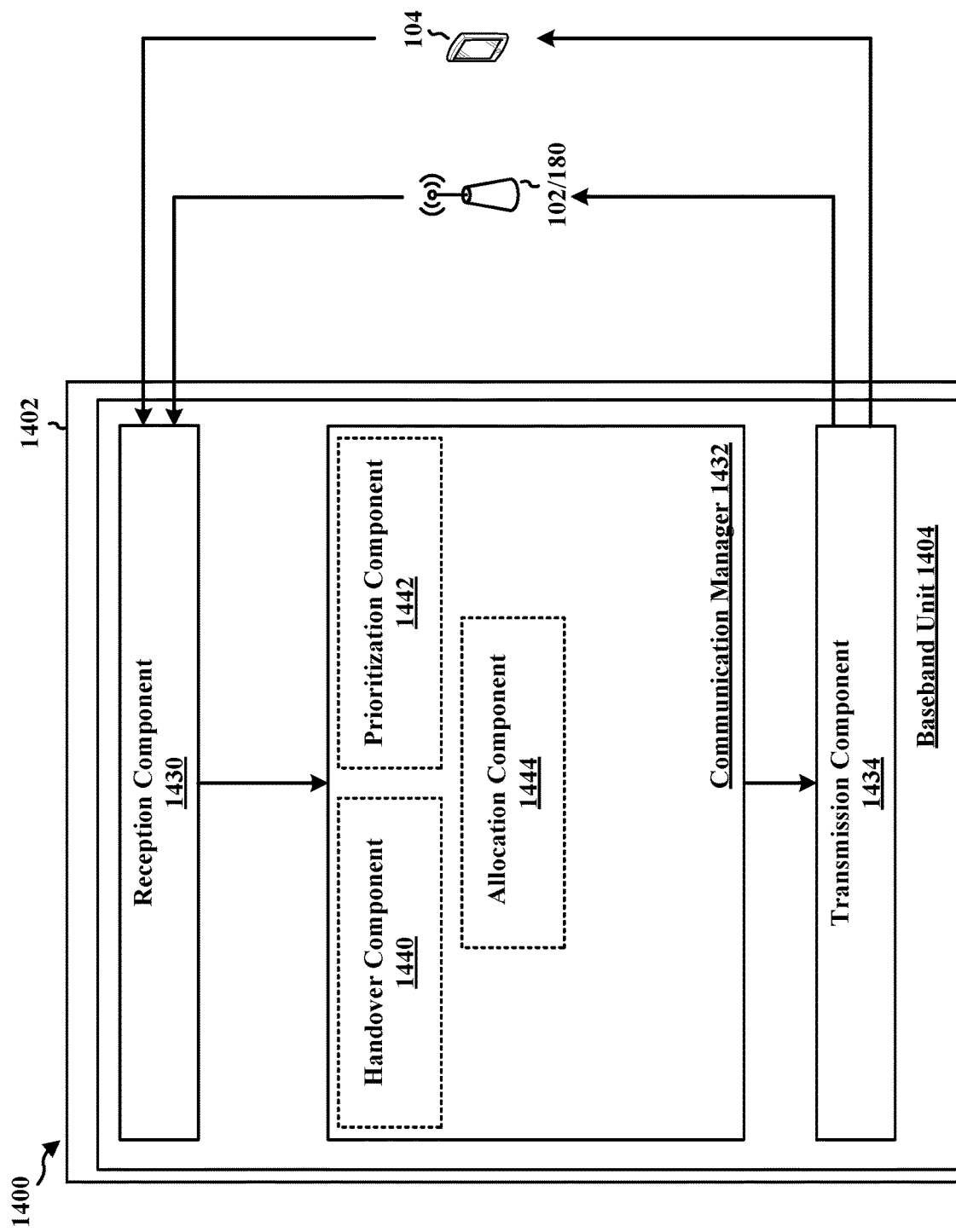
FIG. 14 is a diagram illustrating another example of a hardware implementation for another example apparatus.

FIG. 14 is a diagram 1400 illustrating another example of a hardware implementation for an apparatus 1402. The apparatus 1402 is a base station and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described herein. The computer-readable medium/memory also may be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory or configured as hardware within the baseband unit 1404. The baseband unit 1404 may be a component of the base station 310 and may include the memory 376 or at least one of the TX processor 316, the RX processor 370, and the controller/processor 375.

The apparatus 1402 may receive information from at least one of a UE 104 or a base station 102/180 using the reception component 1430. Additionally or alternatively, the apparatus 1402 may transmit information to at least one of the UE 104 or the base station 102/180 using the transmission component 1434. The reception component 1430 may provide received information to the communication manager 1432, and transmission component 1434 may be provided information to be transmitted from the communication manager 1432.

The communication manager 1432 may include a handover component 1440 that is configured to perform a handover procedure of the UE 104 from the base station 102/180. The handover component 1440 may be configured to determine to accept transfer of the UE 104 from the base station 102/180. For example, the handover component 1440 may be configured to generate an acknowledgement of a handover request received from the base station 102/180 acknowledging (and accepting) the request for the UE 104 be handed over to the apparatus 1402 from the base station 102/180. The handover component 1440 may be configured to establish a connection with the UE 104 during the handover procedure from the base station 102/180, such as described in connection with 1202 of FIG. 12.

The reception component 1430 may receive, from the base station 102/180, an indication that the UE 104 is buffering data pending transmission before handover of the UE from the other base station is complete, such as described in connection 1102 of FIG. 11 or 1204 of FIG. 12. For example, the indication that the UE 104 is buffering data pending transmission may include at least one amount of data for at least one subgroup of the data for which resources remain to be allocated. In another example, the indication of the UE 104 having data for which resources remain to be allocated may include at least one ID associated with at least one subgroup of the data.

In some aspects, the at least one ID identifies at least one LCG associated with the at least one subgroup of the data. In some further aspects, the indication of the UE 104 having data for which resources remain to be allocated may include two or more remaining amounts of the at least one subgroup of data for each of a set of LCHs to which the at least one LCG maps, In some other aspects, the at least one ID identifies at least one DRB associated with the at least one subgroup of the data. In some aspects, the indication of the UE 104 having data for which resources remain to be allocated may include a difference between an amount of data for which the UE 104 requested resources to be allocated and at least one of a capacity of other resources allocated by the base station 102/180 or an amount of data received by the base station 102/180 on the other resources. In some other aspects, the indication of the UE 104 having data for which resources remain to be allocated is included in at least one of a SN status transfer message, another BSR, or a buffer size report.

The communication manager 1432 may further include a prioritization component 1442 that receives input from the reception component 1430 of the indication of the UE 104 having data for which resources remain to be allocated. The prioritization component 1442 may be configured to prioritize transmission by the UE 104 relative to one or more other transmissions to be received by the apparatus 1402, such as described in connection with 1104 of FIG. 11. For example, the prioritization component 1442 may identify a priority associated with the data at the UE 104 for which resources remain to be allocated, such as a priority of an LCG associated with the data at the UE 104, a priority of a DRB associated with the data at the UE 104, or a priority of an LCH in the LCG associated with the data at the UE 104. The prioritization component 1442 identify one or more other priorities associated with other UE requesting resources on which to transmit to the base station. Further, the prioritization component 1442 may compare the priority associated with the data at the UE 104 for which resources remain to be allocated and the one or more other priorities. Based on the comparisons, the prioritization component 1442 may order the requests for resources according to the priorities relative to one another, such as in descending order of highest priority to lowest priority.

The communication manager 1432 may further include an allocation component 1444 that receives input from the reception component 1430 of the indication of the UE 104 having data for which resources remain to be allocated, from the handover component 1440 of the handover of the UE 104 to the apparatus 1402, and from the prioritization component 1442 of prioritization of transmission by the UE 104 relative to one or more other transmissions to be received by the apparatus 1402. The allocation component 1444 may be configured to allocate a set of resources for transmission of data by the UE 104, such as described in connection with 1106 of FIG. 11. In some aspects, the allocation component 1444 may allocate the set of resources for transmission of the data by the UE 104 according to the prioritization of transmission by the UE 104 relative to one or more other requests for resource allocations.

In some other aspects, the allocation component 1444 may allocate the set of resources using a set of LCHs. For example, the UE 104 may have at least one subgroup of data for which resources remain to be allocated, and the at least one subgroup may be associated with an LCG. The LCG may have a set of LCHs, each of which may be associated with at least a portion of the subgroup of the data. The allocation component 1444 may receive the indication of the UE 104 having data for which resources remain to be allocated, which may include one or more remaining amounts of at least one subgroup of data for each of the set of LCHs to which the LCG maps.

The transmission component 1434 may receive inputs from the communication manager 1432, which may indicate the set of resources allocated for transmission of data by the UE 104. The transmission component 1434 may be configured to transmit a grant to the UE 104 indicating the set of resources allocated for the transmission, such as described in connection with 1108 of FIG. 11 or 1206 of FIG. 12. The transmission component 1434 may transmit the grant before receiving a BSR from the UE 104.

The apparatus 1402 may include additional components that perform some or all of the blocks, operations, signaling, etc. of the algorithm(s) in the aforementioned call flow diagram and flowcharts of FIGS. 7, 11, and 12. As such, some or all of the blocks, operations, signaling, etc. in the aforementioned call flow diagram and flowcharts of FIGS. 7, 11, and 12 may be performed by a component and the apparatus 1402 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for receiving, from another base station, an indication that the UE is buffering data pending transmission before handover of the UE from the other base station is complete; means for allocating a set of resources for transmission of the data by the UE; and means for transmitting a grant to the UE indicating the set of resources allocated for the transmission of the data.

In one configuration, the means for allocating the set of resources for the transmission of the data by the UE is configured to allocate the set of resources for the transmission of the data in absence of a BSR from the UE.

In one configuration, the apparatus 1402, and in particular the baseband unit 1404, may further include means for prioritizing, into priority order, the data pending transmission relative to other data for which resource allocation is requested, and the set of resources is allocated according to the priority order.

In one configuration, the indication that the UE is buffering data pending transmission indicates at least one identifier associated with at least one subgroup of the data.

In one configuration, the indication that the UE is buffering data pending transmission indicates at least one amount of at least a portion of the data that is associated with the at least one subgroup, and the set of resources is allocated to accommodate the at least one amount of the at least a portion of the data.

In one configuration, the at least one identifier identifies at least one LCG associated with the at least one subgroup of the data.

In one configuration, the indication that the UE is buffering data pending transmission indicates a respective remaining amounts of a portion of the data for each of a set of LCHs to which the at least one LCG maps, and the set of resources is allocated according to an order of the set of LCHs.

In one configuration, the at least one identifier identifies at least one DRB associated with the at least one subgroup of the data.

In one configuration, the indication that the UE is buffering data pending transmission indicates a difference between a first amount of data of the UE indicated in a BSR and another amount of data for which another set of resources is allocated by the other base station.

In one configuration, the indication that the UE is buffering data pending transmission is included in at least one of a SN status transfer message, another BSR, or a buffer size report.

The aforementioned means may be one or more of the aforementioned components of the apparatus 1402 configured to perform the functions recited by the aforementioned means. As described herein, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and may be combined with any of the various aspects or teachings described herein, without limitation.

Implementation examples are described in the following numbered clauses:

1. A method of wireless communication at an apparatus of a base station, including:
   allocating a set of resources for transmission by a UE; and
   transmitting, to another base station in association with handover of the UE, an indication that a capacity of the set of resources is insufficient for an amount of data indicated by a BSR from the UE.

2. The method of clause 1, and the indication that the capacity of the set of resources is insufficient for the amount of the data indicated by the BSR indicates at least one amount of at least one subgroup of the data for which resources remain to be allocated.

3. The method of clause 2, and the at least one subgroup of the data is associated with at least one identifier that identifies at least one LCG associated with the at least one subgroup of the data.

4. The method of clause 3, further including:
   calculating a remaining amount in the at least one subgroup of the data for each of a set of LCHs in the at least one LCG using a mapping between the at least one LCG and the set of LCHs for the other base station,
   and the indication that the capacity of the set of resources is insufficient for the amount of the data indicated by the BSR indicates one remaining amount in the at least one subgroup of the data for each of the set of LCHs in the at least one LCG.

5. The method of clause 2, and the at least one subgroup of the data is associated with at least one identifier that identifies at least one DRB associated with the at least one subgroup of the data.

6. The method of clause 1, and the indication that the capacity of the set of resources is insufficient for the amount of the data indicated by the BSR includes a difference between the amount of the data indicated by the BSR and another amount of data for which the set of resources is allocated.

7. The method of clause 1, and the indication that the capacity of the set of resources is insufficient for the amount of the data indicated by the BSR is included in at least one of a SN status transfer message, another BSR, or a buffer size report.

8. The method of clause 1, and the allocating the set of resources for transmission by the UE includes:
   allocating the set of resources with the capacity that is insufficient for the amount of the data indicated by the BSR from the UE.

9. The method of clause 1, further including:
   receiving the BSR from the UE, the BSR indicating at least one identifier associated with at least one subgroup of the data.

10. The method of clause 1, and the BSR includes at least one of a long BSR or a long truncated BSR, and the data includes at least two subgroups of data.

11. The method of clause 1, and the BSR includes at least one of a short BSR or a short truncated BSR.

12. A method of wireless communication by an apparatus of a base station, including:
   receiving, from another base station, an indication that a UE is buffering data pending transmission before handover of the UE from the other base station is complete;
   allocating a set of resources for transmission of the data by the UE; and
   transmitting a grant to the UE indicating the set of resources allocated for the transmission of the data.

13. The method of clause 12, and the allocating the set of resources for the transmission of the data the UE includes:
   allocating the set of resources for the transmission of the data in absence of a BSR from the UE.

14. The method of clause 12, further including:
   prioritizing, into priority order, the data pending transmission relative to other data for which resource allocation is requested, the set of resources being allocated according to the priority order.

15. The method of clause 12, and the indication that the UE is buffering data pending transmission includes at least one identifier associated with at least one subgroup of the data.

16. The method of clause 15, and the indication that the UE is buffering data pending transmission includes at least one amount of at least a portion of the data that is associated with the at least one subgroup, and the set of resources is allocated to accommodate the at least one amount of the at least a portion of the data.

17. The method of clause 15, and the at least one identifier identifies at least one LCG associated with the at least one subgroup of the data.

18. The method of clause 17, and the indication that the UE is buffering data pending transmission includes a respective remaining amount of a portion of the data for each of a set of LCHs to which the at least one LCG maps, and the set of resources is allocated according to an order of the set of LCHs.

19. The method of clause 15, and the at least one identifier identifies at least one DRB associated with the at least one subgroup of the data.

20. The method of clause 12, and the indication that the UE is buffering data pending transmission indicates a difference between a first amount of data of the UE indicated in a BSR and a second amount of data of the UE for which another set of resources is allocated by the other base station.

21. The method of clause 12, and the indication that the UE is buffering data pending transmission is included in at least one of a SN status transfer message, a BSR, or a buffer size report received from the other base station before the handover of the UE is complete.

22. An apparatus for wireless communication at a base station, including:
   means for allocating a set of resources for transmission by a UE; and
   means for transmitting, to another base station in association with handover of the UE, an indication that a capacity of the set of resources is insufficient for an amount of data indicated by a BSR from the UE.

23. The apparatus of clause 22, and the indication that the capacity of the set of resources is insufficient for the amount of the data indicated by the BSR indicates at least one amount of at least one subgroup of the data for which resources remain to be allocated.

24. The apparatus of clause 23, and the at least one subgroup of the data is associated with at least one identifier that identifies at least one LCG associated with the at least one subgroup of the data.

25. The apparatus of clause 24, further including:
   means for calculating a remaining amount in the at least one subgroup of the data for each of a set of LCHs in the at least one LCG using a mapping between the at least one LCG and the set of LCHs for the other base station,
   and the indication that the capacity of the set of resources is insufficient for the amount of the data indicated by the BSR indicates one remaining amount in the at least one subgroup of the data for each of the set of LCHs in the at least one LCG.

26. The apparatus of clause 23, and the at least one subgroup of the data is associated with at least one identifier that identifies at least one DRB associated with the at least one subgroup of the data.

27. The apparatus of clause 22, and the indication that the capacity of the set of resources is insufficient for the amount of the data indicated by the BSR includes a difference between the amount of the data indicated by the BSR and another amount of data for which the set of resources is allocated.

28. The apparatus of clause 22, and the indication that the capacity of the set of resources is insufficient for the amount of the data indicated by the BSR is included in at least one of a SN status transfer message, another BSR, or a buffer size report.

29. The apparatus of clause 22, and the means for allocating the set of resources for transmission by the UE is configured to:
   allocate the set of resources with the capacity that is insufficient for the amount of the data indicated by the BSR from the UE.

30. The apparatus of clause 22, further including:
   means for receiving the BSR from the UE, the BSR indicating at least one identifier associated with at least one subgroup of the data.

31. The apparatus of clause 22, and the BSR includes at least one of a long BSR or a long truncated BSR, and the data includes at least two subgroups of data.

32. The apparatus of clause 22, and the BSR includes at least one of a short BSR or a short truncated BSR.

33. An apparatus for wireless communication at a base station, including:
   means for receiving, from another base station, an indication that a UE is buffering data pending transmission before handover of the UE from the other base station is complete;
   means for allocating a set of resources for transmission of the data by the UE; and
   means for transmitting a grant to the UE indicating the set of resources allocated for the transmission of the data.

34. The apparatus of clause 33, and the means for allocating a set of resources for transmission of the data by the UE is configured to allocate the set of resources for the transmission of the data in absence of a BSR from the UE.

35. The apparatus of clause 33, further including:
   means for prioritizing, into priority order, the data pending transmission relative to other data for which resource allocation is requested, the set of resources being allocated according to the priority order.

36. The apparatus of clause 33, and the indication that the UE is buffering data pending transmission includes at least one identifier associated with at least one subgroup of the data.

37. The apparatus of clause 36, and the indication that the UE is buffering data pending transmission includes at least one amount of at least a portion of the data that is associated with the at least one subgroup, and the set of resources is allocated to accommodate the at least one amount of the at least a portion of the data.

38. The apparatus of clause 36, and the at least one identifier identifies at least one LCG associated with the at least one subgroup of the data.

39. The apparatus of clause 38, and the indication that the UE is buffering data pending transmission includes a respective remaining amount of a portion of the data for each of a set of LCHs to which the at least one LCG maps, and the set of resources is allocated according to an order of the set of LCHs.

40. The apparatus of clause 36, and the at least one identifier identifies at least one DRB associated with the at least one subgroup of the data.

41. The apparatus of clause 33, and the indication that the UE is buffering data pending transmission indicates a difference between a first amount of data of the UE indicated in a BSR and a second amount of data of the UE for which another set of resources is allocated by the other base station.

42. The apparatus of clause 33, and the indication that the UE is buffering data pending transmission is included in at least one of a SN status transfer message, a BSR, or a buffer size report received from the other base station before the handover of the UE is complete.

43. An apparatus for wireless communication at a base station, including:
a memory; and
at least one processor coupled to the memory and configured to:
allocate a set of resources for transmission by a UE; and
transmit, to another base station in association with handover of the UE, an indication that a capacity of the set of resources is insufficient for an amount of data indicated by a BSR from the UE.

44. The apparatus of clause 43, and the indication that the capacity of the set of resources is insufficient for the amount of the data indicated by the BSR indicates at least one amount of at least one subgroup of the data for which resources remain to be allocated.

45. The apparatus of clause 44, and the at least one subgroup of the data is associated with at least one identifier that identifies at least one LCG associated with the at least one subgroup of the data.

46. The apparatus of clause 45, and the at least one processor is further configured to:
calculate a remaining amount in the at least one subgroup of the data for each of a set of LCHs in the at least one LCG using a mapping between the at least one LCG and the set of LCHs for the other base station,
and the indication that the capacity of the set of resources is insufficient for the amount of the data indicated by the BSR indicates one remaining amount in the at least one subgroup of the data for each of the set of LCHs in the at least one LCG.

47. The apparatus of clause 44, and the at least one subgroup of the data is associated with at least one identifier that identifies at least one DRB associated with the at least one subgroup of the data.

48. The apparatus of clause 43, and the indication that the capacity of the set of resources is insufficient for the amount of the data indicated by the BSR includes a difference between the amount of the data indicated by the BSR and another amount of data for which the set of resources is allocated.

49. The apparatus of clause 43, and the indication that the capacity of the set of resources is insufficient for the amount of the data indicated by the BSR is included in at least one of a SN status transfer message, another BSR, or a buffer size report.

50. The apparatus of clause 43, and the allocation of the set of resources for transmission by the UE includes to:
allocate the set of resources with the capacity that is insufficient for the amount of the data indicated by the BSR from the UE.

51. The apparatus of clause 43, and the at least one processor is further configured to:
receive the BSR from the UE, the BSR indicating at least one identifier associated with at least one subgroup of the data.

52. The apparatus of clause 43, and the BSR includes at least one of a long BSR or a long truncated BSR, and the data includes at least two subgroups of data.

53. The apparatus of clause 43, and the BSR includes at least one of a short BSR or a short truncated BSR.

54. An apparatus for wireless communication at a base station, including:
a memory; and
at least one processor coupled to the memory and configured to:
receive, from another base station, an indication that a UE is buffering data pending transmission before handover of the UE from the other base station is complete;
allocate a set of resources for transmission of the data by the UE; and
transmit a grant to the UE indicating the set of resources allocated for the transmission of the data.

55. The apparatus of clause 54, and the allocation of the set of resources for the transmission of the data the UE includes to:
allocate the set of resources for the transmission of the data in absence of a BSR from the UE.

56. The apparatus of clause 54, and the at least one processor is further configured to:
prioritize, into priority order, the data pending transmission relative to other data for which resource allocation is requested, the set of resources being allocated according to the priority order.

57. The apparatus of clause 54, and the indication that the UE is buffering data pending transmission includes at least one identifier associated with at least one subgroup of the data.

58. The apparatus of clause 57, and the indication that the UE is buffering data pending transmission includes at least one amount of at least a portion of the data that is associated with the at least one subgroup, and the set of resources is allocated to accommodate the at least one amount of the at least a portion of the data.

59. The apparatus of clause 57, and the at least one identifier identifies at least one LCG associated with the at least one subgroup of the data.

60. The apparatus of clause 59, and the indication that the UE is buffering data pending transmission includes a respective remaining amount of a portion of the data for each of a set of LCHs to which the at least one LCG maps, and the set of resources is allocated according to an order of the set of LCHs.

61. The apparatus of clause 57, and the at least one identifier identifies at least one DRB associated with the at least one subgroup of the data.

62. The apparatus of clause 54, and the indication that the UE is buffering data pending transmission indicates a difference between a first amount of data of the UE indicated in a BSR and a second amount of data of the UE for which another set of resources is allocated by the other base station.

63. The apparatus of clause 54, and the indication that the UE is buffering data pending transmission is included in at least one of a SN status transfer message, a BSR, or a buffer size report received from the other base station before the handover of the UE is complete.

64. A computer-readable medium storing computer-executable code for wireless communication at a base station, the code when executed by a processor cause the processor to:
allocate a set of resources for transmission by a UE; and
transmit, to another base station in association with handover of the UE, an indication that a capacity of the set of resources is insufficient for an amount of data indicated by a BSR from the UE.

65. The computer-readable medium of clause 64, and the indication that the capacity of the set of resources is insufficient for the amount of the data indicated by the BSR indicates at least one amount of at least one subgroup of the data for which resources remain to be allocated.

66. The computer-readable medium of clause 65, and the at least one subgroup of the data is associated with at least one identifier that identifies at least one LCG associated with the at least one subgroup of the data.

67. The computer-readable medium of clause 66, and the code when executed by the processor further cause the processor to:
calculate a remaining amount in the at least one subgroup of the data for each of a set of LCHs in the at least one LCG using a mapping between the at least one LCG and the set of LCHs for the other base station,
and the indication that the capacity of the set of resources is insufficient for the amount of the data indicated by the BSR indicates one remaining amount in the at least one subgroup of the data for each of the set of LCHs in the at least one LCG.

68. The computer-readable medium of clause 65, and the at least one subgroup of the data is associated with at least one identifier that identifies at least one DRB associated with the at least one subgroup of the data.

69. The computer-readable medium of clause 64, and the indication that the capacity of the set of resources is insufficient for the amount of the data indicated by the BSR includes a difference between the amount of the data indicated by the BSR and another amount of data for which the set of resources is allocated.

70. The computer-readable medium of clause 64, and the indication that the capacity of the set of resources is insufficient for the amount of the data indicated by the BSR is included in at least one of a SN status transfer message, another BSR, or a buffer size report.

71. The computer-readable medium of clause 64, and the allocation of the set of resources for transmission by the UE includes to:
allocate the set of resources with the capacity that is insufficient for the amount of the data indicated by the BSR from the UE.

72. The computer-readable medium of clause 64, and the code when executed by the processor further cause the processor to:
receive the BSR from the UE, the BSR indicating at least one identifier associated with at least one subgroup of the data.

73. The computer-readable medium of clause 64, and the BSR includes at least one of a long BSR or a long truncated BSR, and the data includes at least two subgroups of data.

74. The computer-readable medium of clause 64, and the BSR includes at least one of a short BSR or a short truncated BSR.

75. A computer-readable medium storing computer-executable code for wireless communication at a base station, the code when executed by a processor cause the processor to:
receive, from another base station, an indication that a UE is buffering data pending transmission before handover of the UE from the other base station is complete;
allocate a set of resources for transmission of the data by the UE; and
transmit a grant to the UE indicating the set of resources allocated for the transmission of the data.

76. The computer-readable medium of clause 75, and the allocation of the set of resources for the transmission of the data the UE includes to:
allocate the set of resources for the transmission of the data in absence of a BSR from the UE.

77. The computer-readable medium of clause 75, and the code when executed by the processor further cause the processor to:
prioritize, into priority order, the data pending transmission relative to other data for which resource allocation is requested, the set of resources being allocated according to the priority order.

78. The computer-readable medium of clause 75, and the indication that the UE is buffering data pending transmission includes at least one identifier associated with at least one subgroup of the data.

79. The computer-readable medium of clause 78, and the indication that the UE is buffering data pending transmission includes at least one amount of at least a portion of the data that is associated with the at least one subgroup, and the set of resources is allocated to accommodate the at least one amount of the at least a portion of the data.

80. The computer-readable medium of clause 78, and the at least one identifier identifies at least one LCG associated with the at least one subgroup of the data.

81. The computer-readable medium of clause 80, and the indication that the UE is buffering data pending transmission includes a respective remaining amount of a portion of the data for each of a set of LCHs to which the at least one LCG maps, and the set of resources is allocated according to an order of the set of LCHs.

82. The computer-readable medium of clause 78, and the at least one identifier identifies at least one DRB associated with the at least one subgroup of the data.

83. The computer-readable medium of clause 75, and the indication that the UE is buffering data pending transmission indicates a difference between a first amount of data of the UE indicated in a BSR and a second amount of data of the UE for which another set of resources is allocated by the other base station.

84. The computer-readable medium of clause 75, and the indication that the UE is buffering data pending transmission is included in at least one of a SN status transfer message, a BSR, or a buffer size report received from the other base station before the handover of the UE is complete.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, multiple microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include random-access memory (RAM), read-only memory (ROM), electrically erasable programmable ROM (EEPROM), compact-disc ROM (CD-ROM), or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication at a base station, comprising:
    allocating a set of resources for transmission by a user equipment (UE);
    transmitting, to another base station in association with handover of the UE, an indication that a capacity of the set of resources is insufficient for an amount of data indicated by a buffer status report (BSR) from the UE; and
    calculating a remaining amount in at least one subgroup of the data for each of a set of logical channels (LCHs) in at least one logical channel group (LCG) associated with the at least one subgroup of the data, wherein the calculating the remaining amount in the at least one subgroup of the data for each of the set of logical channels (LCHs) in the at least one LCG is performed using a mapping between the at least one LCG and the set of LCHs for the another base station,
    wherein the indication indicates one remaining amount in the at least one subgroup of the data for each of the set of LCHs in the at least one LCG, and
    wherein the another base station schedules the UE to uplink the remaining amount in the at least one subgroup of the data before the another base station receives a BSR from the UE.

2. The method of claim 1, wherein the at least one subgroup of the data is associated with at least one identifier that identifies at least one dedicated radio bearer (DRB) associated with the at least one subgroup of the data.

3. The method of claim 1, wherein the indication that the capacity of the set of resources is insufficient for the amount of the data indicated by the BSR comprises a difference between the amount of the data indicated by the BSR and another amount of data for which the set of resources is allocated.

4. The method of claim 1, wherein the indication that the capacity of the set of resources is insufficient for the amount of the data indicated by the BSR is included in at least one of a sequence number (SN) status transfer message, another BSR, or a buffer size report.

5. The method of claim 1, wherein the allocating the set of resources for transmission by the UE comprises:
allocating the set of resources with the capacity that is insufficient for the amount of the data indicated by the BSR from the UE.

6. An apparatus for wireless communication at a base station, comprising:
at least one memory; and
at least one processor coupled to the at least one memory and configured to:
allocate a set of resources for transmission by a user equipment (UE);
transmit, to another base station in association with handover of the UE, an indication that a capacity of the set of resources is insufficient for an amount of data indicated by a buffer status report (BSR) from the UE; and
calculate a remaining amount in at least one subgroup of the data for each of a set of logical channels (LCHs) in at least one logical channel group (LCG) associated with the at least one subgroup of the data, wherein the calculating the remaining amount in the at least one subgroup of the data for each of the set of LCHs in the at least one LCG is performed using a mapping between the at least one LCG and the set of LCHs for the another base station,
wherein the indication indicates one remaining amount in the at least one subgroup of the data for each of the set of LCHs in the at least one LCG,
wherein the another base station schedules the UE to uplink the remaining amount in the at least one subgroup of the data before the another base station receives a BSR from the UE.

7. The apparatus of claim 6, wherein the at least one subgroup of the data is associated with at least one identifier that identifies at least one dedicated radio bearer (DRB) associated with the at least one subgroup of the data.

8. The apparatus of claim 6, wherein the indication that the capacity of the set of resources is insufficient for the amount of the data indicated by the BSR comprises a difference between the amount of the data indicated by the BSR and another amount of data for which the set of resources is allocated.

9. The apparatus of claim 6, wherein the indication that the capacity of the set of resources is insufficient for the amount of the data indicated by the BSR is included in at least one of a sequence number (SN) status transfer message, another BSR, or a buffer size report.

* * * * *